(12) United States Patent
Chen

(10) Patent No.: US 8,781,165 B2
(45) Date of Patent: Jul. 15, 2014

(54) METHOD AND APPARATUS FOR DISPLACEMENT DETERMINATION BY MOTION COMPENSATION

(75) Inventor: Wei Chen, Potomac, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 246 days.

(21) Appl. No.: 13/323,975

(22) Filed: Dec. 13, 2011

(65) Prior Publication Data

US 2012/0148110 A1    Jun. 14, 2012

Related U.S. Application Data

(60) Provisional application No. 61/422,758, filed on Dec. 14, 2010.

(51) Int. Cl.
*G06K 9/00* (2006.01)
*H04N 7/18* (2006.01)
*H04N 5/225* (2006.01)

(52) U.S. Cl.
USPC ............ 382/103; 382/107; 348/154; 348/169

(58) Field of Classification Search
None
See application file for complete search history.

(56) References Cited

U.S. PATENT DOCUMENTS

| 6,535,647 | B1 | 3/2003 | Abousleman | |
| 6,539,122 | B1 | 3/2003 | Abousleman | |
| 6,804,400 | B1 | 10/2004 | Sharp | |
| 8,432,974 | B2 | 4/2013 | Chen | |
| 2003/0021472 | A1 | 1/2003 | Nichogi et al. | |
| 2006/0222078 | A1* | 10/2006 | Raveendran | 375/240.16 |
| 2006/0269140 | A1 | 11/2006 | Ramsay et al. | |
| 2008/0151101 | A1* | 6/2008 | Tian et al. | 348/448 |
| 2009/0028243 | A1* | 1/2009 | Suzuki et al. | 375/240.15 |
| 2009/0161753 | A1 | 6/2009 | Youn et al. | |
| 2011/0002532 | A1* | 1/2011 | Frakes et al. | 382/154 |
| 2011/0007819 | A1 | 1/2011 | Chen | |
| 2011/0081050 | A1 | 4/2011 | Chen | |
| 2011/0255605 | A1* | 10/2011 | Chang et al. | 375/240.18 |
| 2012/0147263 | A1 | 6/2012 | Chen | |
| 2012/0148110 | A1 | 6/2012 | Chen | |
| 2012/0148111 | A1 | 6/2012 | Chen | |
| 2012/0148112 | A1 | 6/2012 | Chen | |

OTHER PUBLICATIONS

Chen, W., "A Global Optimal Solution with Higher Order Continuity for the Estimation of Surface Velocity from Infrared Images", IEEE Trans. Geosci. Rem. Sens.,vol. 48, No. 4, pp. 1931-1939, (Apr. 2010).

(Continued)

*Primary Examiner* — Randolph I Chu
(74) *Attorney, Agent, or Firm* — US Naval Research Laboratory; Sally A. Ferrett

(57) ABSTRACT

Motion estimator apparatus and methods are presented in which a fully constrained nonlinear system of equations combing forward and backward displaced frame difference (DFD) equations with a plurality of displacement vector invariant (DVI) equations is solved using the input data from two image frames without approximation and without imposing any additional constraints or assumptions to obtain an estimated displacement field. Also presented is an adaptive framework for solving a system of motion estimation equations.

22 Claims, 9 Drawing Sheets

(56) References Cited

OTHER PUBLICATIONS

Chen, W.; "The global optimal surface velocity field near shoreline from infrared images", International Symposium on Photoelectronic Detection and Imaging 2009: Advances in Infrared Imaging and Applications, Proc. of SPIE vol. 7383, 738333-1-738333-10, conference dates Jun. 17-19, 2009, published Aug. 4, 2009.

Chen, W., "Surface Velocity Estimation From Satellite Imagery Using Displaced Frame Central Difference Equation", IEEE Trans. Geoscience and Remote Sensing, vol. 50, No. 7, pp. 2791-2801, date of publication Jan. 23, 2012.

Chen, W.; "Nonlinear Inverse Model for Velocity Estimation from an Image Sequence", J. Geophys. Res., vol. 116, pp. C06015-1-C06015-15, Jun. 22, 2011.

Chen, W., "A Nonlinear Model for Velocity Estimation from Infrared Image Sequences", International Archives of the Photogrammetry, Remote Sensing, and Spatial Information Science (ISPRS), Commission VIII, WG VIII/9 ,vol. XXXVIII, Part 8, Kyoto, Japan, pp. 958-963, conference date Aug. 9-12, 2010.

Chen, W., "Conservative Motion Estimation from Multi-image Sequences", ISVC 2010, Proceedings Part I, Lecture Notes in Computer Science 6453, pp. 427-436, symposium date Nov. 29, 2010-Dec. 1, 2010.

Li, H.; Astrid, L.; Robert, F., "Image Sequence Coding at Very Low Bitrates: A Review"; IEEE Trans. Image Processing, vol. 3, No. 5, pp. 589-609, (Sep. 1994).

Stiller, C.; Konrad, J.; "Estimating motion in image sequences: A tutorial on modeling and computation of 2D motion", IEEE Signal Processing Magazine, pp. 70-91, (Jul. 1999).

Dubois, E., "Motion-compensated filtering of time-varying images", Multidimens. Syst. Signal Process, vol. 3, pp. 211-239, (1992).

Orchard M.T.; Sullivan, G.J.; "Overlapped block motion compensation: An estimation-theoretic approach," IEEE Trans. Image Process., vol. 3, No. 5, pp. 693-699, (Sep. 1994).

Castagno, R.; Haavisto, P.; Ramponi, G.; "A method for motion adaptive frame rate up-conversion", IEEE Trans. Circuits Syst. Video Technol., vol. 6, No. 5, pp. 436-446, (Oct. 1996).

Girod, B., "Efficiency analysis of multihypothesis motion-compensatedprediction for video coding," IEEE Trans. Image Process., vol. 9, No. 2, pp. 173-183, (Feb. 2000).

Lee, S.H.; Kwon, O.; Park, R.H.; "Weighted-adaptive motion-compensated frame rate up-conversion," IEEE Trans. Consum. Electron., vol. 49, No. 3, pp. 485-492, (Aug. 2003).

Wedi, T., "Adaptive interpolation filters and high-resolution displacements for video coding", IEEE Trans. Circuits Syst. Video Technol., vol. 16, No. 4, pp. 484-491, (2006).

Gan, Z.; Qi, L.; and Zhu, X.; "Motion compensated frame interpolation based on H.264 decoder," Electron. Lett., vol. 43, No. 1, pp. 96-98, (2007).

Choi, B.D.; Han, J.W.; Kim, C.S.; Ko, S.J.; "Motion-compensated frame interpolation using bilateral motion estimation and adaptive overlapped block motion compensation", IEEE Trans. Circuits Syst. Video Technol., vol. 17, No. 4, pp. 407-416, (2007).

Huang, A.-M.; Nguyen, T.; "A multistage motion vector processing method for motion-compensated frame interpolation," IEEE Trans. Image Process., vol. 17, No. 5, pp. 694-708, (May 2008).

Zhang, Y.; Zhao, D.; Ji, X.; Wang, R.; Gao, W.; "A Spatio-Temporal Auto Regressive Model for Frame Rate Up conversion", IEEE Trans. Circuit Syst., vol. 19, No. 9, pp. 1289-1301, (Sep. 2009).

Zhang, Y.; Zhao, D.; Ma, S.; Wang, R.; and Gao, W.; "A Motion-Aligned Auto-Regressive Model for Frame Rate Up Conversion", IEEE Transactions on Image Processing, vol. 19, No. 5, pp. 1248-1258, (May 2010).

Wang, C.; Zhang, L.; He, Y.; and Tan, Y.-P.; "Frame Rate Up-Conversion Using Trilateral Filtering", IEEE Trans. Circuit Syst., vol. 20, No. 6, pp. 886-893, (Jun. 2010).

Horn, B.; Shunck, B.; "Determining optical flow", Artificial Intelligence, No. 17, pp. 185-203, (Apr. 1980).

Lucas, B. D.; "Generalized image matching by the method of differences", PhD thesis, Carnegie Mellon Univ., (1984).

Bigun, J.; Granlund, G.H.; Wiklund, J.; "Multidimensional orientation estimation with applications to texture analysis and optical flow", IEEE TPAMI, (Aug. 1991).

Black, M.J.; Anandan, P.; "The robust estimation of multiple motions: parametric and piecewise smooth flow fields", Computer Vision and Image Understanding, vol. 63, No. 1, pp. 75-104, (1996).

Heitz, F.; Bouthemy, P.; "Multimodal estimation of discontinuous optical flow using Markov random fields", IEEE Transactions on Pattern Analysis and Machine Intelligence, vol. 15, No. 12, pp. 1217-1232, (1993).

Nesi, P., "Variational approach to optical flow estimation managing discontinuities", Image and Vision Computing, vol. 11, No. 7, pp. 419-439, (1993).

Weickert, J.; Schnorr, C.; "A theoretical framework for convex regularizers in PDE-based computation of imagemotion", International Journal of Computer Vision, vol. 45, No. 3, pp. 245-264, (2001).

Bruhn, A.; Weickert, J.; Schnorr, C.; "Lucas/Kanade Meets Horn/Schunck: Combining Local and Global Optic Flow Methods", International Journal of Computer Vision, vol. 61, No. 3, pp. 211-231, (2005).

Papenberg, N.; Bruhn, A.; Brox, T.; Didas, S.; Weickert, J.; "Highly Accurate Optic Flow Computation with Theoretically Justified Warping", International Journal of Computer Vision, vol. 67, No. 2, pp. 141-158, (2006).

Glazer, F., et al., "Scene matching by hierarchical correlation," Proc. IEEE Comp. Vision Pattern Recognition Conf., (Washington, DC), DTIC, 10 pages, Jun. 1983.

Ghanbari, H.; Mills, M. ; "Block matching motion estimations: New results," IEEE Trans. Circuit Syst., vol. 37, pp. 649-651, 1990.

Seferidis V.; Ghanbari, M.; "General approach to block-matching motion estimation," Journal of Optical Engineering, vol. 32, pp. 1464-1474, Jul. 1993.

Shi, J.; Tomasi, C.; "Good features to track", Proc. Computer Vision and Pattern Recognition, pp. 593-600, Jun. 1994.

Baker, S.; Scharstein, D.; Lewis, J.P.; Roth, S.; Black, M.J.; Szeliski, R.; "A Database and Evaluation Methodology for Optical Flow", Int J Comput Vis, vol. 92, pp. 1-31, conference date Oct. 2007.

Brox, T.; "Highly Accurate Optic Flow Computation with Theoretically Justified Warping", International Journal of Computer Vision, vol. 67, No. 2, pp. 141-158, (2006).

Robbins, J.D.; Netravali A.N., "Recursive motion compensation: A review", in "Image Sequence processing and Dynamic Scene Analysis", T. S. Huang, ed., pp. 76-103, Berlin, Germany, Springer-Verlag, (1983).

Liu, Y.; Huang, T.S.; "Vehicle-Type Motion Estimation from Multi-frame Images", IEEE Trans. Pattern Anal. Mach. Intell., vol. 15, No. 8, pp. 802-808, (Aug. 1993).

Bergen, J. R.; Burt, P. J.; Hingorani, R.; Peleg, S.; "A three-frame algorithm for estimating two-component image motion", IEEE Trans. Pattern Anal. Mach. Intell., vol. 14, No. 9, pp. 886-896, (Sep. 1992).

Shariat, H.; Price, K.; "Motion estimation with more than two frames", IEEE Trans. Pattern Anal. Mach. Intell. vol. 12. No. 5, pp. 417-434, May 1990).

Barron, J.L., Fleet, D.J., Beauchemin, S.S., "Performance of optical flow techniques", International Journal of Computer Vision, vol. 12, No. 1, pp. 43-77, (1994).

Leese, J.A.; Novak, C.S.; "An automated technique for obtaining cloud motion from geosynchronous satellite data using cross correlation," J. Appl. Meteor., vol. 10, No. 1, pp. 118-132, 1971.

Emery, W.J.; Thomas, A.C.; Collins, M.J.; Crawford, W.R.; Mackas, D.L.; "An Objective Method for Computing Advective Surface Velocities from Sequential Infrared Satellite Images," J. Geophys. Res., vol. 91, pp. 12865-12878, 1986.

Nagel, H. H.; Enkelmann, W.; "An investigation of smoothness constraints for the estimation of displacement vector fields from image sequences", IEEE Trans. Pattern Anal. Mach. Intell., vol. 8, pp. 565-593, (1986).

Uras, S.; Girosi, F.; Verri, A.; Torre,V.; "A computational approach to motion perception", Biological Cybernetics, vol. 60, pp. 79-87, (1988).

(56) References Cited

OTHER PUBLICATIONS

Konrad, J.; Dubois, E., "Baysian Estimation of Motion Vector Fields", IEEE Trans. Pattern Analysis and Machine Intelligence, vol. 14, No. 9, pp. 910-927, Sep. 1992.

Alvarez, L.; Esclarin, J.; Lefebure, M.,Sanchez, J.; "A PDE model for computing the optical flow, Proc. XVI Congreso de Ecuaciones Diferenciales y Aplicaciones", Las Palmas de Gran Canaria, Spain, pp. 1349-1356, Intelligence, vol. 13. No. 8, pp. 775-790, (1999).

Aubert, G.; Deriche, R.; Kornprobst, P.; "Computing optical flow via variational techniques", SIAM Journal on Applied Mathematics, vol. 60, No. 1, pp. 156-182, (1999).

Kumar, A.; Tannenbaum, A.R.; Balas, G.J.; "Optic flow: a curve evolution approach"; IEEE Transactions on Image Processing, vol. 5, No. 4, pp. 598-610, (1996).

Proesmans, M., et al., "Determination of optical flow and its discontinuities using non-linear diffusion", Computer Vision—ECCV '94, J. O. Eklundh (Ed.), vol. 801, Lecture Notes in Computer Science, Springer, Berlin, pp. 295-304, (1994).

Galvin, B.; McCane, B.; Novins, K.; Mason, D.; Mills, S.; "Recovering motion fields: An analysis of eight optical flow algorithms", Proc. 1998 British Machine Vision Conference, Southampton, England, pp. 195-204, (1998).

McCane, B., Novins, K.; Crannitch. ,D.; Galvin B.; "On Benchmarking Optical Flow", Computer Vision and Image Understanding, vol. 84, pp. 126-143, (2001).

Chen, W.; Mied, R.P.; and Shen, C.Y., "Estimation of Surface Velocity from Infrared Image Using the Global Optimal Solution to an Inverse Model", Geoscience and Remote Sensing Symposium, 2008; IGARSS 2008; IEEE International; vol. 1, pp. I-384-I-386, IEEE, 2008.

Chen, W.; Mied, R. P.; and Shen, C. Y.; "Near-Surface Ocean Velocity from Infrared Images: Global Optimal Solution to an Inverse Model", Journal of Geophysical Research—Oceans, vol. 113, C10003, pp. 1-13, (Oct. 2008).

Emery, W.J.; Thomas, A.C.; Collins, M.J.; Crawford, W.R.; and Mackas, D.L.; "An Objective Method for Computing Advective Surface Velocities from Sequential Infrared Satellite Images", J. Geophys. Res., vol. 91, pp. 12865-12878, (1986).

Kelly, K.A., (1989), "An Inverse Model for Near-Surface Velocity from Infrared Images", J. Phys. Ocean., vol. 19, pp. 1845-1864, (1989).

Kelly, K.A.; and Strub, P.T., Comparison of Velocity Estimates from Advanced Very High-Resolution Radiometer in the Coastal Transition Zone, J. Geophys. Res., vol. 97, pp. 9653-9668, (1992).

Ostrovskii, A., and Piterbarg, L., Inversion for Heat Anomaly Transport from Sea-Surface Temperature Time-Series in the Northwest Pacific, J. Geophys. Res., vol. 100, pp. 4845-4865, (Mar. 1995).

Ostrovskii A.G., and Piterbarg L.I., "Inversion of Upper Ocean Time Series for Entrainment, Advection, and Diffusivity", J. Phys. Ocean., vol. 30, pp. 201-204, (2000).

Vigan, X.; Provost, C.; Bleck, R.; and Courtier, P.; "Sea surface velocities from sea surface temperature image sequences 1. Method and validation using primitive equation model output", J. Geophys. Res., vol. 105, pp. 19499-19514, (2000).

Vigan. X. et al., "Sea Surface Velocities from Sea Surface Temperature Image Sequences 2. Application to the Brazil-Malvinas Confluence Area", J. Geophys. Res., vol. 105, pp. 19515-19534, (2000).

Zavialov, P.O., et al., "An Inverse Model for Seasonal Circulation over the Southern Brazilian Shelf: Near-Surface Velocity from the Heat Budget," J. Phys. Ocean., vol. 28, pp. 545-562, (1998).

Chubb, S.R.; Mied, R.P.; Shen, C.Y.; Chen, W.; Evans, T.E.; and Kohut, J.; "Ocean Surface Currents from AVHRR Imagery: Comparison with Land-based HF Radar Measurements", IEEE Trans. on Geoscience and Remote Sensing, vol. 46, No. 11, pp. 3647-3660, (Nov. 2008).

Frankignoul, C. "Sea surface temperature anomalies, planetary waves, and air-sea feedback in the middle latitudes", J. Geophys. Res., vol. 23, pp. 357-390, (Nov. 1985).

Kundu, P. K., "Ekman veering observed near the ocean bottom", J. Phys. Ocean., vol. 6, pp. 238-242, (1976).

Kohut, J.T.; Glenn, S.M.; and Chant, R.J.; "Seasonal Current Variability on the New Jersey Inner Shelf", J. Geophys. Res.—Oceans, vol. 109, pp. C07S07-1-C07S07-16, (2004).

Press, W.H.; Teukolsky, S.A.; Vetterling, W.T.; and Flannery, B.P.; "Numerical Recipes in C", Cambridge University Press, 2nd Edition, pp. 123-124, (1992).

Shen, C.Y.; and Evans, T.E.; "Inertial instability and sea spirals", Geophys. Res. Lett., vol. 29, No. 23, pp. 39-1-39-4, doi: 10.1029/2002GL015701, (2002).

Shen, C.Y.; Evans, T.E.; Mied, R.P.; and Chubb, S.R.; "A velocity projection framework for inferring shallow water currents from surface tracer fields", "Cont. Shelf Research", vol. 28, pp. 849-864, 2008. (Available online Jan. 26, 2008).

Wentz, F.J.; Gentemann, C.; Smith, D.; and Chelton, D.; "Satellite measurements of sea surface temperature through clouds", Science, vol. 288, pp. 847-850, (May 2000).

Jing Zhang and Guizhong Liu, "An efficient reordering prediction-based lossless compression algorithm for hyperspectral images", Apr. 2007, IEEE Geoscience and Remote Sensing Letters, vol. 4, No. 2, pp. 283-287.

Jing Zhang and Guizhong Liu, "A novel lossless compression for hyperspectral images by adaptive classified arithmetic coding in wavelet domain", 2006, IEEE International Conference on Image Processing (ICIP), pp. 2269-2272.

* cited by examiner

METHOD AND APPARATUS FOR DISPLACEMENT DETERMINATION BY MOTION COMPENSATION

REFERENCE TO RELATED APPLICATION

This application is a nonprovisional under 35 USC 119(e) of, and claims priority to and the benefit of U.S. Provisional Patent Application Ser. No. 61/422,758, filed Dec. 14, 2010, the entirety of which is hereby incorporated by reference.

BACKGROUND

The present disclosure relates generally to image processing and more particularly to apparatus and techniques for motion determination or estimation in processing image data. Computer vision and remote sensing applications often utilize motion determination from an image sequence for video coding or other purposes. The determination of a displacement or motion field under brightness or tracer conservation constraints from an image sequence has thus far been considered an under-constrained problem. In general, the determination of the instant velocities from an image sequence or a physical displacement field from a featureless image sequence is ill-posed. Conventional motion estimation involves finding a velocity or displacement field using successive image frames, and existing motion estimation models and algorithms assume that the image intensity recorded from different physical sensors obey a conservation constraint for tracer, heat, or optical flow in space and time.

The inverse problem of the determination of the motion field under brightness (or tracer) conservation constraint from an image sequence has been considered as an under-constrained problem because two unknown velocity components must be derived from a single conservation equation at each of these pixel points, which is sometimes referred to as the aperture problem. The aperture problem indicates that the physical observation may not be consistent with the physical motion if there are not enough texture structures on moving objects. The physical determination of a displacement vector in a featureless image sequence is ill-posed, but this texture dependent problem is different from the under-constrained problem. In the past, the under-constrained problem has been addressed by using different models or frameworks with additional constraints and assumptions. For instance, Pel-Recursive techniques have been proposed, and differential techniques have been proposed using regularization, uniform velocity in a block (template), gradient conservation, and velocity field modeling with bilinear or B-spline type constraints. In addition, Bayesian methods have been proposed in which the motion field is modeled as a Markovian random field. However, these conventional techniques suffer from computational inefficiencies and inaccuracies which can lead to errors in video coding and other computer vision and remote sensing applications. Accordingly, a need remains for improved methods and apparatus for processing image sequence data to determine displacement by motion compensation.

SUMMARY OF DISCLOSURE

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

The inventor has appreciated that although the under-constrained problem was previously understood as implying that only one brightness or tracer conservation constraint equation can describe a single pixel for solving two unknown variables for a motion vector without additional assumptions, the system can in fact be solved without imposing hypothetical constraints. In particular, the inventor has conceived an approach by forward and backward motion compensation using the data points of two image frames to determine a displacement field, and thus the inverse problem for determination of a displacement field is generally not under-constrained as previously thought.

A fully constrained nonlinear system of equations combing forward and backward displaced frame difference (DFD) equations with a Displacement Vector Invariant (DVI) equation is solved using the input data from two image frames without approximation and without imposing any additional constraints or assumptions to obtain an estimated displacement field. Also disclosed is an adaptive framework for solving the particular nonlinear systems of equations. The innovation facilitates motion estimation to derive displacement fields that are consistent with physical observations exemplified by the image data frames, even where the observation may not be consistent with the physical motion in a featureless image sequence. Thus, in certain embodiments, the estimated displacement field is based on a single minimized target function that leads to optimized motion-compensated predictions and interpolations in a wide class of applications of the motion-compensated compression without any penalty parameters.

The present disclosure thus provides motion estimator techniques and apparatus in which a fully constrained nonlinear system of equations is solved to determine a displacement field describing displacement vectors at first and second times corresponding to first and second image frames, without approximation and without imposing any additional constraints or assumptions.

In accordance with one or more aspects of the present disclosure, a motion estimator apparatus is provided, including at least one processor and a memory. The memory stores a fully constrained nonlinear equation set including forward and backward displaced frame difference equations and two or more displacement vector invariant equations. The processor receives an input image sequence that includes a pair of image frames with multidimensional image data corresponding to pixel locations at corresponding times. The processor solves the equation set using the image frames to determine a displacement field describing displacement vectors at pixel locations at one of the times by solving displacement field values at the other time from the DVI equations.

In certain embodiments, the equation set includes a pair of forward DVI equations, and in other embodiments, a pair of backward DVI equations is used. In certain embodiments, moreover, the processor solves the set of equations using iteration equations derived from the equation set by conversion to a fully or over-constrained system using a nonlinear least squares model of the displacement field. In certain embodiments, the processor solves the equation set using one or more bilinear polynomial functions expressing a multidimensional displacement field and Progressive Relaxation of the Over-Constraint (PROC) algorithm.

A method is provided in accordance with further aspects of the disclosure for processing an image sequence. The method includes providing a fully constrained nonlinear equation set including forward and backward displaced frame difference equations as well as a plurality of displacement vector invariant equations. First and second image frames are received, each including multidimensional image data corresponding to a plurality of pixel locations at corresponding times. The method further includes solving the equation set using the image frames to determine a displacement field describing displacement vectors at pixel locations at one time by solving displacement field values at the other time from the DVI equations.

In accordance with further aspects of the disclosure, a method is provided for solving a system of equations for motion estimation, including creating a motion field model based on a fundamental equation system using a bilinear interpolation function, deriving a system of iteration equations for solving the motion field on node points based on a least-squares principle, and solving the system of iteration equations for the motion field on node points using an iterative technique. In certain embodiments, the iteration equations system is solved by progressively relaxing a degree of over-constrained by selectively reducing a block size during the iteration.

In accordance with further aspects of the disclosure, a computer readable medium is provided with computer executable instructions for performing the disclosed motion estimation methods.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the following drawings.

DETAILED DESCRIPTION OF THE DISCLOSURE

Figure 1:
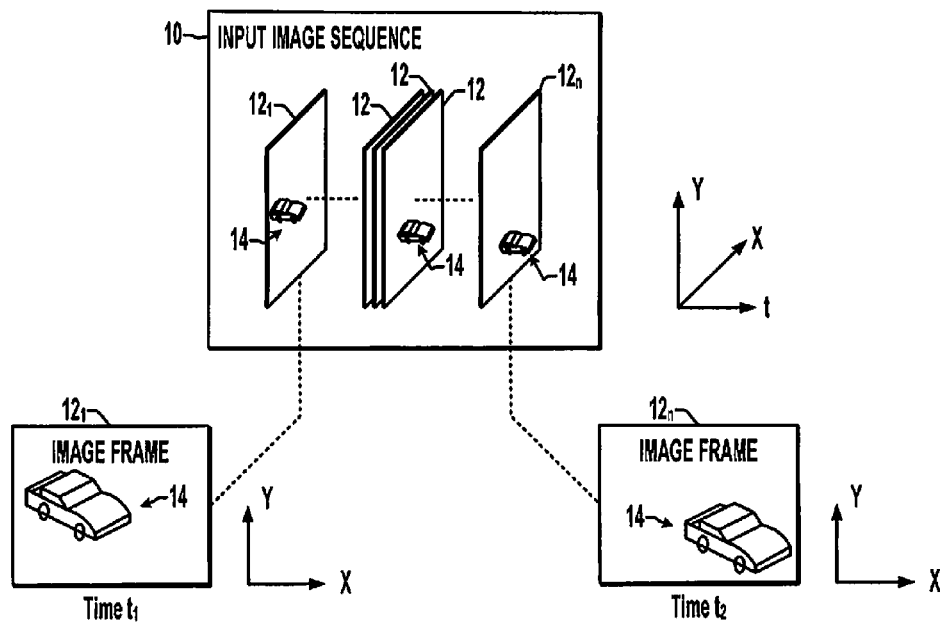
FIGS. 1 and 2 are schematic diagrams illustrating an input video image sequence which includes first and second image frames and corresponding pixel data obtained at different times.

One or more embodiments or implementations are hereinafter described in conjunction with the drawings, where like reference numerals refer to like elements throughout, and where the various features are not necessarily drawn to scale.

Figure 2:
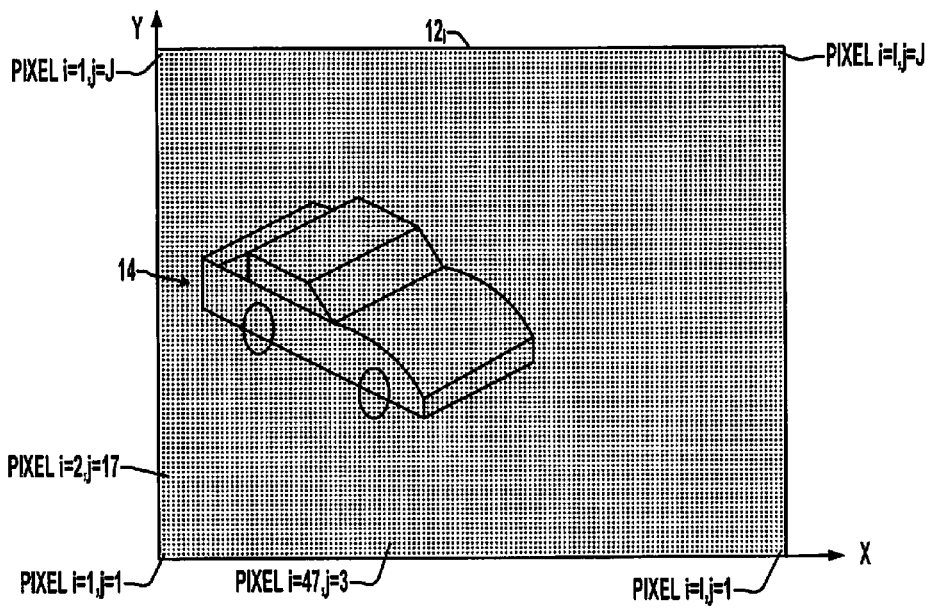

FIG. 1 illustrates an input image sequence 10 with a plurality of image frames 12 including a first image frame $12_1$, a final frame $12_n$, and one or more intervening frames 12 wherein the input sequence 10 can include any number "n" frame 12, where n is an integer greater than 1. As seen in FIG. 2, each individual image frame $12_i$ includes an integer number of pixel data values, each corresponding to a two-dimensional pixel location in an X-Y plane, where each pixel location is indicated with an integer subscript index "i" indicating an X direction pixel index ($1 \leq i \leq I$) and an integer subscript index "j" indicating a Y direction pixel index ($1 \leq j \leq J$). In the illustrated example, moreover, the image data represents optical (e.g., visible) data, such as video frame 12, where the input sequence 10 shows a vehicle artifact 14 moving towards a lower right corner of the image frame as the sequence proceeds from an initial (e.g., first) time $t_1$ (frame $12_1$) to a final (e.g., second) time $t_2$ (frame $12_n$). In practice, as is known, the individual image data for a given pixel location i,j can be a single value representing light intensity (luminance) and/or an individual data point may include luminance as well as color or chrominance data values (e.g., L*a*b*, RGB, CMYK data, etc.). In other embodiments, the image sequence 10 can include multidimensional image data representing "thermal" images, for instance, where the data values represent temperature, or other image sequences can be used in which the image intensity is recorded from physical sensors, for tracer, heat, or optical flow in space and time.

Figure 3:
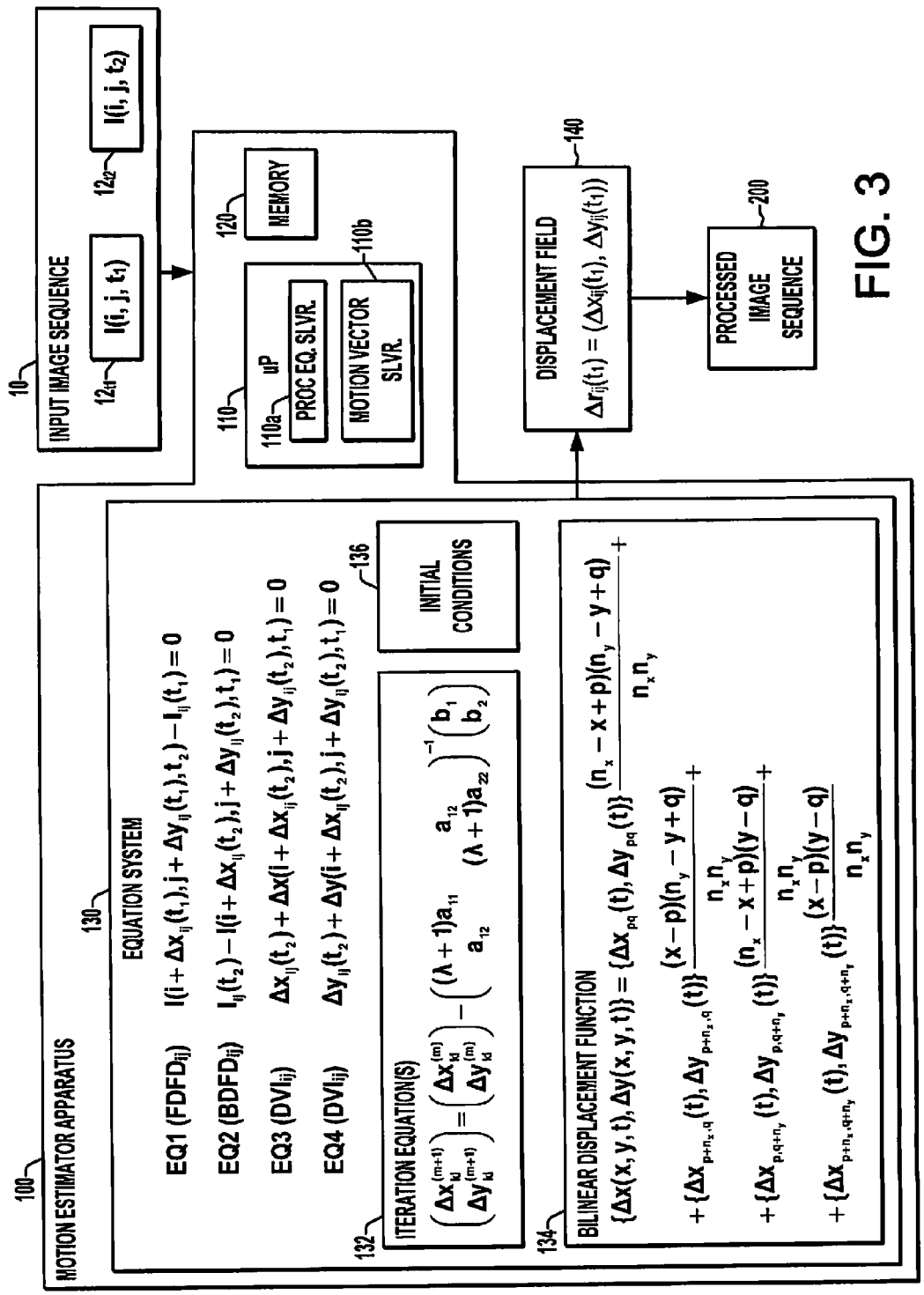
FIG. 3 is a schematic diagram illustrating an exemplary processor-implemented motion estimator apparatus using a fully constrained set of nonlinear equations to determine a displacement vector field from the input image sequence of FIGS. 1 and 2.

FIG. 3 illustrates an exemplary motion estimator apparatus 100 that can perform various image processing tasks including determining or estimating a motion or displacement field 140 from an input image sequence 10 having a first image frame $12_{t1}$ including multidimensional image data corresponding to a plurality of pixel locations i, j at a first time $t_1$, and a second image frame $12_{t2}$ including multidimensional image data corresponding to a plurality of pixel locations at a second time $t_2$. The apparatus 100 can be used to determine a displacement field 140 according to the disclosed techniques for any two image frame 12, which may but need not be the initial and final frames 12 of an input image sequence 10. The apparatus 100 includes one or more processors 110 operatively coupled with a memory 120, and the apparatus 100 can be implemented in a single processing device or in distributed fashion across two or more processing elements 110. In the illustrated embodiment of FIG. 3, the processor 110 implements a PROC equation solver 110a used for solving iteration equations 132 with a Progressive Relaxation of the Over-Constraint (PROC) algorithm, as well as a Motion Vector Solver 110b is designed for solving the motion vectors at time $t=t_2$ with a bilinear motion vector function 134 during an iteration. In addition, the motion estimator apparatus 100 may form part of a larger system, such as a video processor coupled to a transmitter, a video camera, a frame rate up-converter, etc.

The estimator apparatus 100 receives the input image sequence 10 and generates a displacement vector field 140 which can be stored in the internal memory 120 and/or maybe outputted by the apparatus 100 alone or as part of a processed image sequence 200. In addition, the estimator provides an equation system 130, which may be stored in the electronic memory 120. The illustrated estimator 100 further includes at least one iteration equation 132 and the bilinear displacement (or motion) vector function 134, which can be stored in the memory 120 or otherwise be accessible for use by the processor 110 in performing the displacement field estimation function set forth herein. In particular, the iteration equations 132 in certain embodiments are derived from the equation set 130 by conversion to a fully or over-constrained system using a nonlinear least squares model of the displacement field, as discussed further below. In addition, the bilinear motion vector function 134 in certain embodiments expresses a multidimensional displacement field. The bilinear displacement vector function 134 in certain embodiments can be represented by compact form shown in equation (10) below.

The equation system 130 is a fully constrained nonlinear equation set of equations, where four exemplary equations are illustrated in the example of FIG. 3. In this regard, the derived or estimated displacement field 140 describes displacement vectors $\Delta r_{ij}(t_1)$ or $\Delta r_{ij}(t_2)$ at pixel locations i,j at one of the first and second times $t_1$ or $t_2$, for example a first displacement vector $\Delta r_{ij}(t_1)=(\Delta x_{ij}(t_1), \Delta y_{ij}(t_1))$ at $t_1$, or a second displacement vector $\Delta r_{ij}(t_2)=(\Delta x_{ij}(t_2), \Delta y_{ij}(t_2))$ at $t_2$. In the illustrated two dimensional case, the equation set 130 includes a forward displaced frame difference equation (FDFD$_{ij}$), a backward displaced frame difference equation (BDFD$_{ij}$), and two displacement vector invariant equations (DVI$_{ij}$), which are shown as equations (7) and (8) below. In one embodiment shown in FIG. 4, the third and fourth equations of the set 130 are forward displacement vector invariant equations (FDVI), and in another embodiment shown in FIG. 5, the third and fourth equations are backward DVI equations (BDVI). Using the image data from the two received input frames $12_{t1}$ and $12_{t2}$ corresponding to times $t_1$ and $t_2$, the processor 110 is programmed to solve the equation set 130 to determine a displacement field (140) describing displacement vectors $\Delta r_{ij}(t_1)$ or $\Delta r_{ij}(t_2)$ at pixel locations i, j at $t_1$ or $t_2$ using initial conditions 136 including presetting displacement field values at the other time. In this regard, the set of four equations 130 has a total of four unknown variables for each pixel location i, j, namely $\Delta x_{ij}(t_1), \Delta y_{ij}(t_1), \Delta x_{ij}(t_2),$ and $\Delta y_{ij}(t_2)$, and therefore the equation set 130 is fully constrained without approximation and without imposition of any additional constraints or assumptions.

In certain embodiments, the PROC equation Solver 110a is programmed to solve the equation set 130 using an iterative numerical and PROC techniques to determine the displacement field 140, and may employ any suitable initial conditions and loop termination logic, including without limitation a maximum number of iterations per pixel location i, j, alone or in combination with termination based on computed value changes being less than a predetermined threshold value. In certain embodiments, the Motion Vector Solver 110b solves the equations (3) and (4) below using a damped Newton-Raphson method with suitable initial values used in the computation. In other embodiments, the Motion Vector Solver 110b solves the equations (3) and (4) using bilinear modeling of the displacement field 140. The estimator 100 may provide the derived displacement field 140 for use in a variety of applications, such as video processing using an interpolator to construct one or more additional frames for frame rate up-conversion. In another example, the estimator 100 may provide the displacement field 140 for use with compression processing in a video encoder for selectively dropping certain frames 12 received with the input image sequence 10.

Figure 6A:
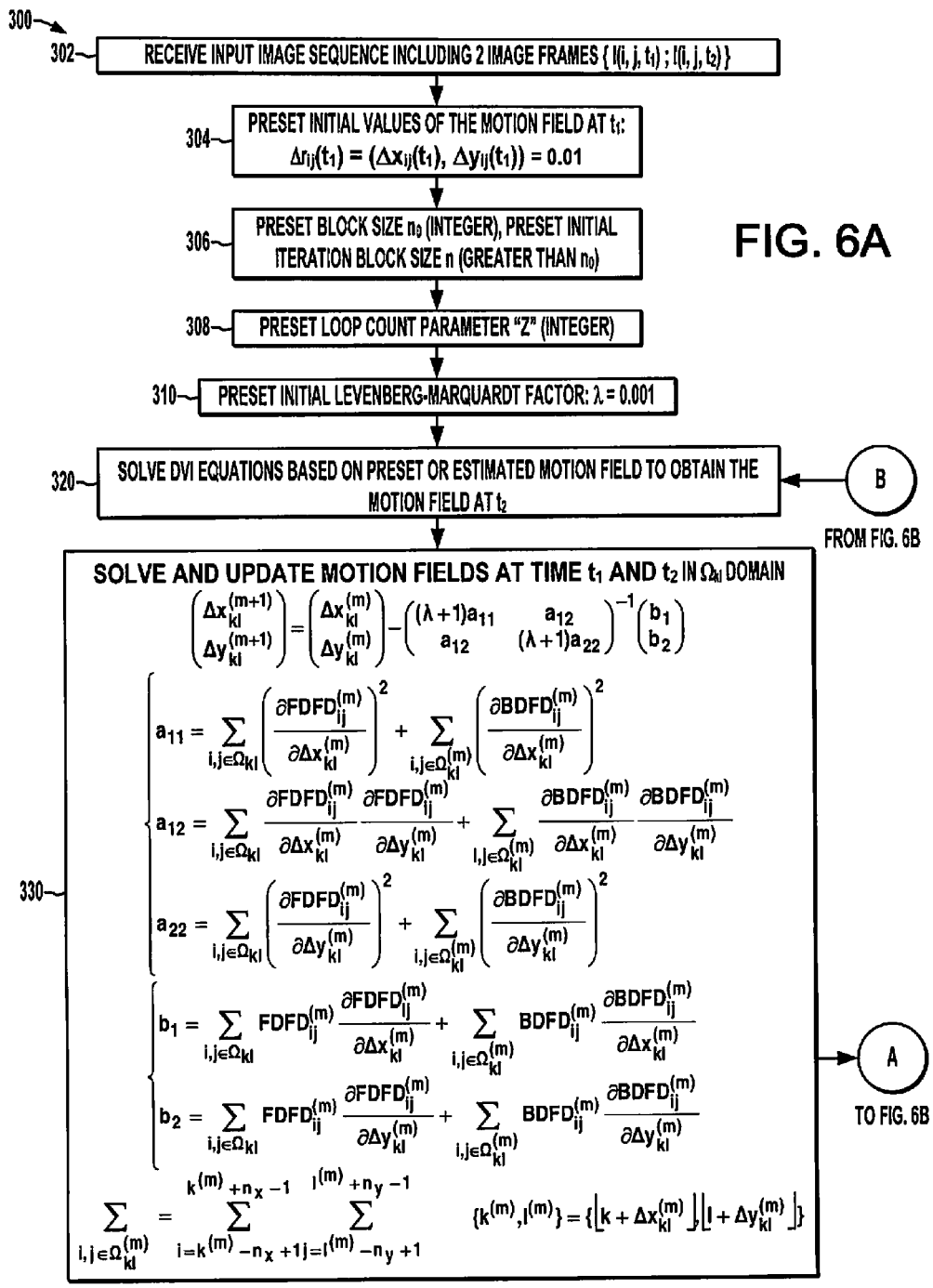
FIGS. 6A and 6B are flow diagrams illustrating an exemplary method for processing an image sequence having two image frames to estimate a motion vector field in accordance with the present disclosure.
Figure 6B:
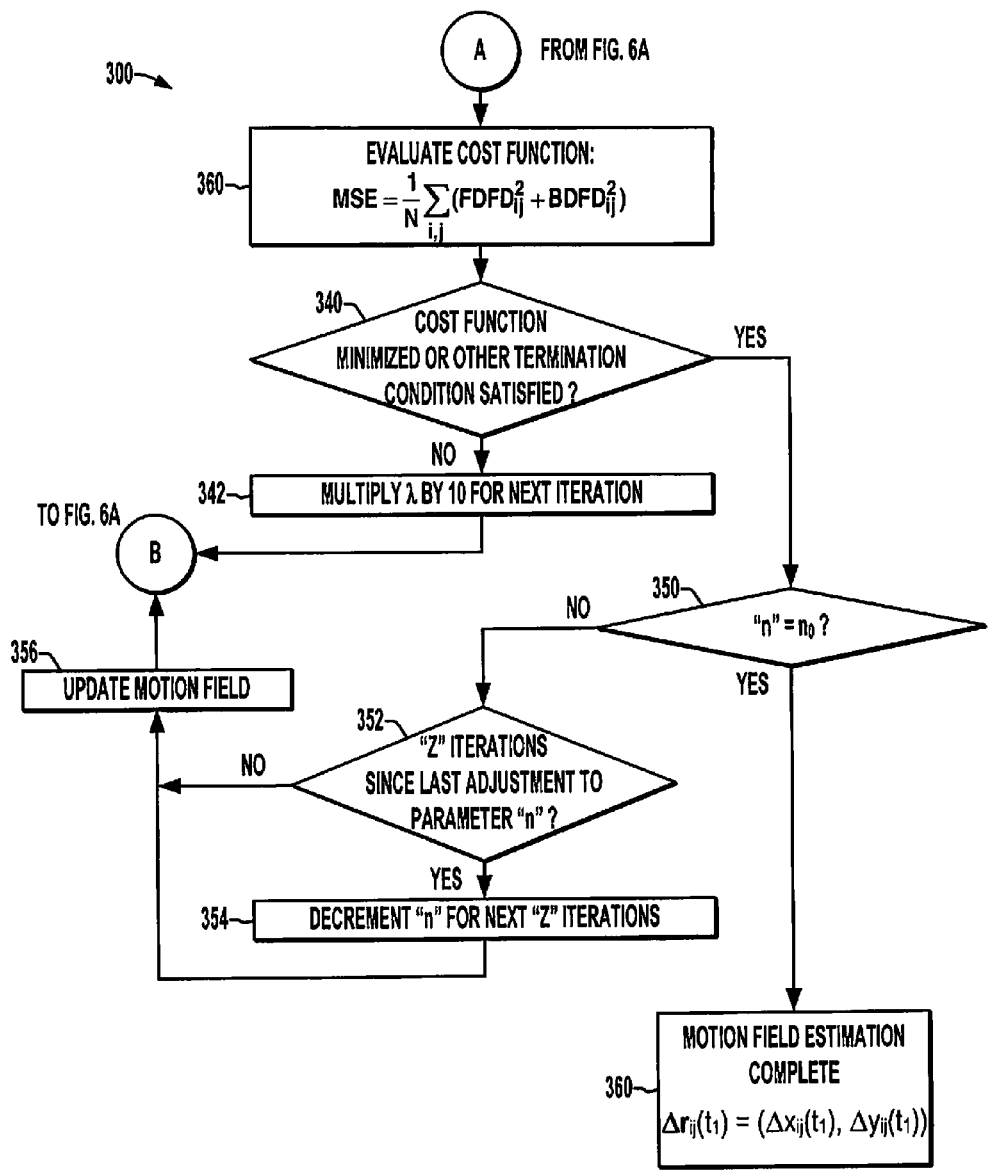

FIGS. 6A and 6B illustrate an exemplary method 300 for processing image data from an input image sequence 10 in accordance with further aspects of the present disclosure. While the method 300 is illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such illustrated acts may be combined or omitted. The illustrated method 300 may be implemented in hardware, processor-executed software, or combinations thereof, such as in the exemplary motion estimator apparatus 100 described above, and may be embodied in the form of computer executable instructions stored in a computer readable medium, such as in a memory 120 operatively associated with the processor 110 in one example.

At 302 in FIG. 6A, an input image sequence 10 is received including two frames, where the frame $12_{t1}$ includes a plurality of data values at time $t_1$ $l(i, j, t_1)$, and the second frame $12_{t2}$ includes data values $l(i, j, t_2)$ at time $t_2$ (e.g., image intensity data "I", which itself can be multidimensional (e.g., CMYK, etc.), and can represent optical, thermal, or other image data types, where the input frames 12 can be stored in the estimator memory 120 in certain embodiments. The method 300 also includes presetting initial values of the motion field at an initial reference time (e.g., $t_1$) at 304. In one possible implementation illustrated in FIG. 6A, seed values for the velocity vector components $u_{ij}(t_1)$ and $v_{ij}(t_1)$ are initialized at 304 to be 0.01 for each pixel location i, j, although this is one non-limiting example. A block size integer value ($n_0$) is preset at 306, which represents an integer number of pixels within an analysis block or tile of the images 12, and in certain embodiments sets the values for $n_x$ and $n_y$ to indicate the number of interpolation points on the orthogonal "x" and "y" directions of the image frames 12. In the example of FIG. 6A, any integer value can be used for presetting the block size $n_0$, such as 5 in one implementation. At 306, moreover, an initial iteration block size n is preset to an integer value that is greater than $n_0$ (e.g., n is initially set to be $n_0+10$ in one example). As discussed below, certain embodiments of the displacement field estimator apparatus 100 implements a progressive relaxation algorithm in which the block size "n" is selectively reduced during iteration to progressively relax an amount of over-constraint of the equation set 130. At 308, a loop count parameter "Z" is preset to an integer value, such as 10 in one example. In addition, an initial Levenburg-Marquardt factor $\lambda$ is preset at 310 for the iteration processing. In one example, this factor $\lambda$ is preset to 0.001, although other values can be used.

Figure 4:
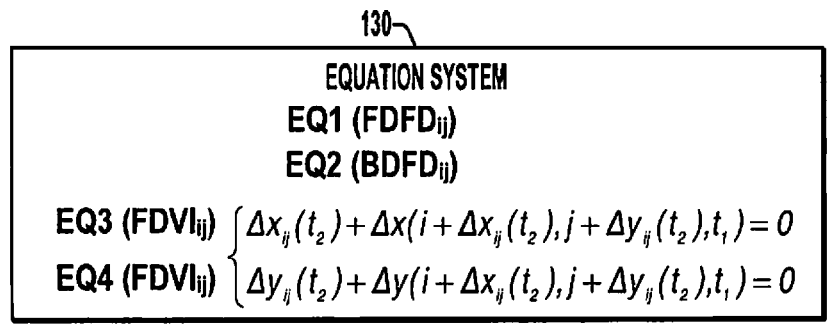
FIG. 4 is a schematic diagram illustrating an exemplary fully constrained set of nonlinear equations including forward and backward displaced frame difference equations and two forward displacement vector invariant equations in the motion estimator apparatus of FIG. 3.
Figure 5:
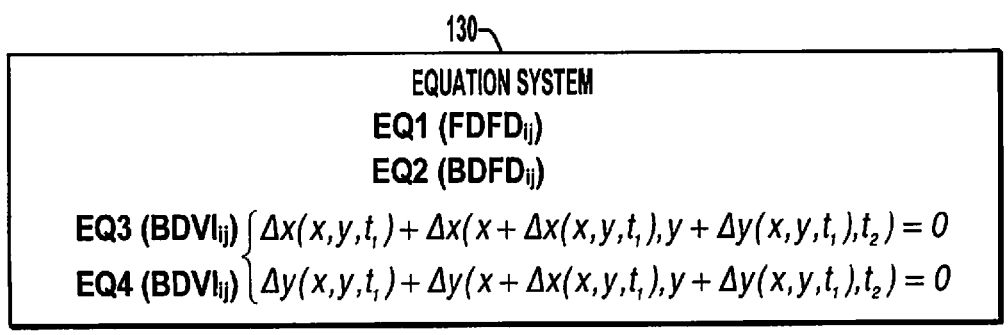
FIG. 5 is a schematic diagram illustrating another exemplary fully constrained set of nonlinear equations including forward and backward displaced frame difference equations and two backward displacement vector invariant equations in the motion estimator apparatus of FIG. 3.

At 320 in FIG. 6A, a fully constrained nonlinear equation set is provided (e.g., equation set 130 in FIGS. 3-5 above) that includes a forward displaced frame difference equation (e.g., FDFD$_{ij}$), a backward displaced frame difference equation (e.g., BDFD$_{ij}$), and two or more displacement vector invariant equations (e.g., DVI$_{ij}$), which can be forward DVI equations (FIG. 4) or backward DVI equations (FIG. 5). The equation set is then solved for the displacement field (e.g., displacement field 140) at one of the first and second times ($t_1$, $t_2$) using known or estimated displacement field values at the other of the first and second times ($t_1$, $t_2$). Any suitable numerical technique can be employed at 330 to solve the equation set 130, such as Damped Newton-Raphson or other iterative technique, using bilinear modeling of the displacement field 134, etc., wherein any suitable initial values and termination conditions may be employed.

In the illustrated embodiment, the displacement vectors on node points are solved at 130 (FIG. 6A) by the iteration equations 132 and the displacement field estimate $\Delta r_{ij}(t_1)$ is updated and $\Delta r_{ij}(t_2)$ is solved in the local domain $\Omega_{kl}$ (FIGS. 8 and 9 below), after which the process 300 proceeds to 360 in FIG. 6B where a cost function is evaluated. A determination is made at 340 (FIG. 6B) as to whether the cost function is minimized or another termination condition is satisfied. If so (YES at 340), a determination is made at 350 as to whether the block size "n" is equal to the final block size value $n_0$ preset at 304 in FIG. 6A. If so (YES at 350), the motion field estimation is complete at 360.

If the cost function is not minimized and no other termination conditions are satisfied (NO at 340 in FIG. 6B), the Levenburg-Marquardt factor $\lambda$ is multiplied by 10 for the next iteration at 342, and the process 300 returns to again solve the displacement vectors at 320 and the iteration equations at 330 in FIG. 6A. This iterative algorithm continues as described above until the cost function is minimized or another termination condition is satisfied (YES at 340) and the block size "n" has not yet reached the preset value of $n_0$ (NO at 350). In this case, a determination is made at 352 as to whether the preset value "Z" iterations have occurred since the last adjustment to the block size parameter "n". If so (YES at 352), the block size "n" is decremented at 354, and the displacement field estimate $\Delta r_{ij}(t_1)$ is updated at 356, after which the process 300 returns to again solve the iteration equations at 330 in FIG. 6A. Otherwise (NO at 352 and FIG. 6B), the current block size value "n" is maintained, the displacement field estimate $\Delta r_{ij}(t_1)$ is updated at 356, and the process 300 returns to 330 in FIG. 6A for further iterations. In this manner, the process 300 provides an iterative approach for estimating the $\Delta r_{ij}(t_1) = \{\Delta x_{ij}(t_1), \Delta y_{ij}(t_1)\}$ at the reference time $t_1$ using the bidirectional DFD and DVI equations and the iteration equations 132 in the system 130.

As noted above, the motion estimator apparatus 100 employs a fully constrained nonlinear system of equations 130 which includes forward and backward displaced frame difference equations (EQ1 and EQ2 in FIG. 3 above) as well as two or more displacement vector invariant equations (EQ3 and EQ4 in FIG. 3). In addition, the displacement vector invariant equations may be either forward DVI equations or backward DVI equations in certain embodiments.

As further discussed below, the inventor has appreciated that such an equation set 130 facilitates motion determination from an image sequence in a variety of computer vision and remote sensing applications such as velocity or displacement estimation from motion, object tracking or recognition, medical imaging, advanced video editing, and ocean surface current estimation. The use of this fully constrained equation set 130 without having to make further approximations or to impose any additional constraints or assumptions provides a novel solution to the inverse problem of motion estimation in two successive image frames 12. In this regard, determination of the instant velocity is ill-posed because the information about the path and rate is lost after a temporal sampling. If the images have enough texture morphologies, both initial and final configurations of a moving particle are recorded by the image sequence. The inverse problem for determination of the displacement field 140, however, is well-posed because both initial and final positions can be determined and observed physically based on the input image sequence 10.

The inventor has appreciated that if the initial and final positions of a particular artifact (e.g., artifact 14 in FIG. 2 above) can be physically observed and determined from an image sequence, a fully constrained system of equations 130 can be constructed for resolving the inverse problem. If the initial and final positions cannot be physically determined or observed, the fully constrained equation system 130 can still be used to solve the inverse problem, although there may exist multiple solutions of the fully constrained (nonlinear) system 130 that are consistent with the physical observation. In addition, all motion fields are defined by the displacement field 130 or the average (conservative) velocity fields denoted by $v = \bar{v} = \Delta r/\Delta t$, where $\Delta r$ is the displacement vector and $\Delta t = t_2 - t_1$ is the time difference between image frames at time $t_1$ and $t_2$.

As used herein, "conservative velocity" is not intended to mean that the physical velocity is a conservative quantity. This concept of equivalent motion fields between the displacement and the conservative velocity is based on the definition. If the initial and final positions of a moving particle or artifact in two successive frames are the only input information, the unique total displacement vector may be associated with many different intermediate dynamic motion states. However, only the motion with the conservative velocity is collinear with the displacement trajectory (a straight line). Focusing strictly on the initial and final results, the conservative velocity as used herein is the resolved velocity field, i.e., the solved velocity is only an average (conservative) velocity. To avoid any misunderstanding on this concept, all derivations in this disclosure are based on the displacement vector field 140 that describes displacement vectors ($\Delta r_{ij}(t_1)$, $\Delta r_{ij}(t_2)$) with respect to pixel locations (i, j) at the first and second times ($t_1$, $t_2$). In this respect, it is understood that there is only limited information available from an input image sequence 10 to study the inverse problem without any way of absolutely knowing the real physical (dynamic) processes or the identity of physical objects, which can be rigid bodies, liquid flow, or deformed objects in an image scene 12, but the above described processed 300 can be advantageously employed to determine motion fields that are consistent with the physical observation.

To illustrate, a function l(r, t) is defined as a scalar property (e.g., intensity) of a continuum of particles that may be expressed as a point function of the coordinates (r=r(t)), where "r" is a multidimensional position (e.g., x and y positions in a two dimensional example). In other examples, depending on the application, l(r, t) can be defined as the intensity of the optical flow (in computer vision), the tracer concentration (ocean color), or the temperature of heat flow (in geosciences and remote sensing). If the intensity between two images is conserved, then the following equation (1) represents the conservation constraint, regardless of a source term:

$$\frac{dl}{dt} = \left(\frac{\partial}{\partial t} + v \cdot \nabla\right)l = 0, \quad (1)$$

where the operator $\frac{d}{dt}$ denotes a total derivative with respect to time t, and $$v = \frac{dr}{dt} = v(r(t), t)$$

is the velocity vector in Cartesian coordinates. Equation (1) is sometimes referred to as the optical flow or brightness conservation constraint equation (in computer vision), or the heat flow or tracer conservation equation (in geophysics), and is a differential form of conservation constraint. The differential form of the conservation constrained equation (1) which contains linear terms of the components of the velocity holds only for infinitesimal or close infinitesimal motions. In order to constrain the image scenes at time $t=t_1$ and $t=t_2$, equation (1) is an integrated from time $t_1$ to $t_2$ as follows:

$$\int_{t_1}^{t_2} \frac{dI(r(t),t)}{dt} dt = I(r(t_2), t_2) - I(r(t_1), t_1) \equiv 0, \quad (2)$$

where $r(t_1)$ and $r(t_2)$ are the position vectors at time $t_1$ and $t_2$. If a displacement vector field is defined by $\Delta r = r(t_2) - r(t_1)$, then the displaced frame difference (DFD) equation is given by DFD=$I(r(t_1)+\Delta r, t_2) - I(r(t_1), t_1) \equiv 0$. The conservation constraint equation (1) is thus temporally integrated into the path independent equation (2). It is noted that although the DFD equation is an implicit function on the displacement field 140, the two path independent terms in equation (2) correspond to the initial and final states of motion associated with the two successive frames for this conservation system. Employing the DFD equation derived by integrating between time of two successive frames can achieve higher accuracy in comparison with the differential form of the conservation constraint optical flow equation (1) (a first order term of Taylor expansion of the DFD), especially for large scale displacement motion estimation. As the image intensity change at a point due to motion has only one constraint equation (1), while the motion vector at the same point has two components (a projection case), the motion field was previously believed to be not computable without an additional constraint.

Figure 7A:
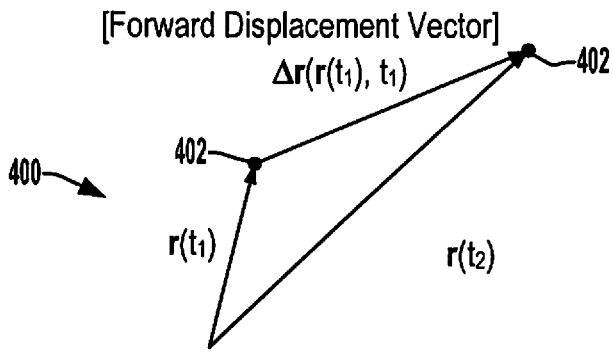
FIG. 7A is a vector diagram illustrating an exemplary forward displacement vector.
Figure 7B:
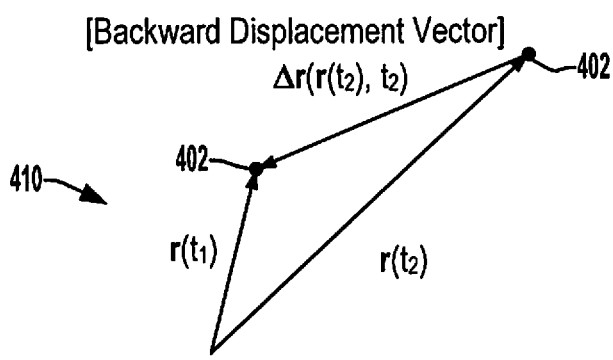
FIG. 7B is a vector diagram illustrating a corresponding backward displacement vector.
Figure 7C:
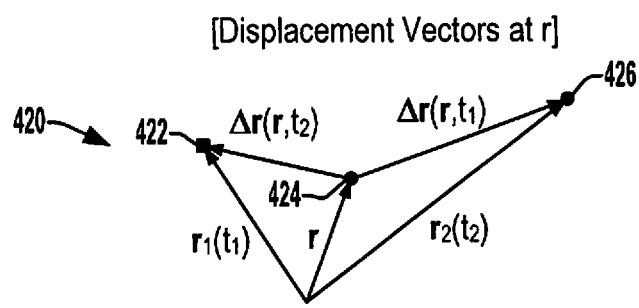
FIG. 7C is a vector diagram illustrating exemplary displacement vectors corresponding to a pair of moving particles in an image sequence.

Referring also to FIGS. 7A-7C, the displacement vector $\Delta r(r(t_1), t_1)$ (forward displacement vector) connects the initial and final positions of the particle 402 as shown in the plot 400 of FIG. 7A and the velocity field is the time rate of change of the property with respect to specific particles of the moving continuum. The same displacement vector on an image scene at time $t_1$ and $t_2$ may have two different forms. We define these displacement vectors $\Delta r(r(t_1), t_1)$ and $\Delta r(r(t_2), t_2)$ as shown in the graph 404 10 of FIGS. 7A and 7B as forward and backward displacement vectors, respectively. FIG. 7C shows forward and backward displacement vectors at a fixed position r at times $t_1$ and $t_2$ for two particles (square and round in the figure), where the square particle begins at position 422 (at $t_1$) and ends at position 424 (at $t_2$), and the round particle begins at position 424 (at $t_1$) and ends at position 426 (at $t_2$) in FIG. 7C. If the displacement vector r(t) is defined by a forward or backward vector on image frames 12 at times $t_1$ and $t_2$, the Displacement Vector Invariant (DVI) equation is given by $$\Delta r(r(t_2), t_2) + \Delta r(r(t_2) + \Delta r(r(t_2), t_2), t_1) = 0, \quad (3)$$

or $$\Delta r(r(t_1), t_1) + \Delta r(r(t_1) + \Delta r(r(t_1), t_1), t_2) = 0,$$

and the Conservative Velocity Constraint (CVC) equation is given by $$v(r(t_1)) + \Delta v(r(t_1), t_1) \Delta t, t_2) = v(r(t_1), t_1). \quad (4)$$

or $$v(r(t_2), t_2) = v(r(t_1)) - v(r(t_2), t_2) \Delta t, t_1),$$

where $\Delta t = t_2 - t_1$.

The DVI equation (3) establishes an implicit function relationship between the forward and backward displacement fields. Both displacement and conservation velocity fields are equivalent based on the definition. According to the definition of the forward and backward displacement vectors $\Delta r(r(t_1), t_1)$ and $\Delta r(r(t_2), t_2)$ in FIGS. 7A and 7B, we have the following equations (5):

$$\Delta r(r(t_1), t_1) = -\Delta r(r(t_2), t_2) \quad (5)$$

$$\begin{cases} \Delta r(r(t_1), t_1) = r(t_2) - r(t_1) = v(r(t_1), t_1)(t_2 - t_1) \\ \Delta r(r(t_2), t_2) = r(t_1) - r(t_2) = v(r(t_2), t_2)(t_1 - t_2). \end{cases}$$

Equations (5) indicate that both the displacement and conservative vectors are equivalent because each vector can be obtained by multiplying and dividing a time different factor $(t_2-t_1)$ or $(t_1-t_2)$. The DVI equation (3) indicates that the motion fields at time $t_1$ and $t_2$ are not equal at the same position, but both fields have a shift from each other for moving objects. The shift vector is the displacement vector of the time differences. Equation (3) or (4) establishes an implicit recursive relationship at time $t_1$ and $t_2$ for the displacement vector fields or conservative velocity fields. The inventor has appreciated that since the DVI equation (3) or the CVC equation (4) is a vector equation, the total number of component equations is equal to the number of dimensions of the velocity, and as a result, if one field is given or solved then another corresponding field can be determined by equation (3) or (4) completely.

A fully constrained system of equations 130 can thus be provided in the motion estimator apparatus 100 using the motion compensation concept. The temporal integral form of the conservation constraint equation (2) or the DFD equation indicates that the image at time $t_1$ can be predicted by motion-compensated prediction with an image at time $t_2$ and the displacement field 140 at time $t_1$, thus facilitating interpolation or extrapolation for video coding and/or frame rate up-conversion applications. Also, the image at time $t_2$ can be predicted also with an image at time $t_1$ and the displacement field 140 at time $t_2$. The inventor has thus found that the equation (2) can be described forward and backward at a fixed position based on the displacement fields 140 at different times $t_1$ and $t_2$.

Assuming that the number of pixels in an image frame 12 is equal to N, the total number of data points is equal to 2×N for an input image sequence 10 having two frames (e.g., frames $12_{t1}$ and $12_{t2}$ in FIG. 3 above). A fully constrained nonlinear system of equations 130 using forward and backward DFD equations combined with the DVI equations (4) for resolving the displacement field is thus given by the following equation (6):

$$\begin{cases} FDFD(r, \Delta r(r, t_1)) = I(r + \Delta r(r, t_1), t_2) - I(r, t_1) = 0 \\ BDFD(r, \Delta r(r, t_2)) = I(r, t_2) - I(r + \Delta r(r, t_2), t_1) = 0 \\ DVI = \Delta r(r, t_2) + \Delta r(r + \Delta r(r, t_2), t_1) = 0, \end{cases} \quad (6)$$

where $\Delta r(r, t_1)$ and $\Delta r(r, t_2)$ are the forward and backward displacement fields 140 at a fixed position r as shown in FIG. 7C. Both the FDFD and BDFD equations at a fixed position r are independent for the displacement fields $\Delta r(r, t_1)$ and $\Delta r(r, t_2)$. The total number of two unknown components of $\Delta r(r, t_1)$ or $\Delta r(r, t_2)$ is equal to 2×N. If one of the fields $\Delta r(r, t_1)$ and $\Delta r(r, t_2)$ is chosen as an independent motion field, another field can be solved by the DVI equation. The total unknown variables 2×N in equations (6) is equal to the total number of constraint equations (6) and as well as the total number of data points in an image sequence. Therefore, both data points and equations match and provide sufficient data information and constraints to solve the two components of the displacement vector 140 without resort to any additional sum assumptions or constraints.

The forward and backward displacement vectors on two image frames 12$_{t1}$ and 12$_{t2}$ at times $t_1$ and $t_2$ as shown in FIGS. 7A and 7B are defined by equations (5), and substituting the position vectors $r(t_2)$ and $r(t_1)$ from equations (5) into equation (2) yields the following two equations:

$$\begin{cases} I(r(t_1) + \Delta r(r(t_1), t_1), t_2) - I(r(t_1), t_1) = 0 \\ I(r(t_2), t_2) - I(r(t_2) + \Delta r(r(t_2), t_2), t_1) = 0. \end{cases}$$

Since the above two equations hold for all image scenes, the equations (6) result if all position vectors in above equations are at a fixed position r, and the first and second equations are denoted by FDFD and BDFD. The solution to the inverse problem is therefore based on the motion analysis in physics, the DVI equation, and recognized different displacement fields at time $t_1$ and $t_2$ in both FDFD and BDFD equations. If the forward displacement field is chosen as independent variables, the DVI equations (whether forward DVI equations or backward DVI equations are used) link the FDFD and BDFD equations together for solving the forward two component displacement field.

Using the conservative velocity and CVC equation to replace the displacement vector and DVI equation in (6), a set of fully constrained nonlinear system of equations 130 can be determined for solving the conservative velocity field. Defining a function with discrete variables i and j as $f_{ij}(t)=f(i, j, t)$, the FDFD, BDFD, and the component DVI equations in (6) on a given pixel point i, j are given by the following equations (7) and (8) as the equation set 130:

$$\begin{cases} FDFD_{ij} = I(i + \Delta x_{ij}(t_1), j + \Delta y_{ij}(t_1), t_2) - I_{ij}(t_1) = 0 \\ BDFD_{ij} = I_{ij}(t_2) - I(i + \Delta x_{ij}(t_2), j + \Delta y_{ij}(t_2), t_1) = 0, \end{cases} \quad (7)$$

and $$\begin{cases} \Delta x_{ij}(t_2) + \Delta x(i + \Delta x_{ij}(t_2), j + \Delta y_{ij}(t_2), t_1) = 0 \\ \Delta y_{ij}(t_2) + \Delta y(i + \Delta x_{ij}(t_2), j + \Delta y_{ij}(t_2), t_1) = 0, \end{cases} \quad (8)$$

where $\Delta r_{ij}(t)=(\Delta x_{ij}(t), \Delta y_{ij}(t))^T$. The displacement vector field at time $t_2$ is a function of the field at time $t_1$ based on the DVI equation (8), where the same is true of the backward DVI equations discussed below. There are several available techniques for solving nonlinear systems of equations 130. For example, a damped Newton-Raphson method is an efficient technique, but a converged solution may be facilitated by having a good guess for the initial values, especially for a huge dimensional problem.

Figure 10:
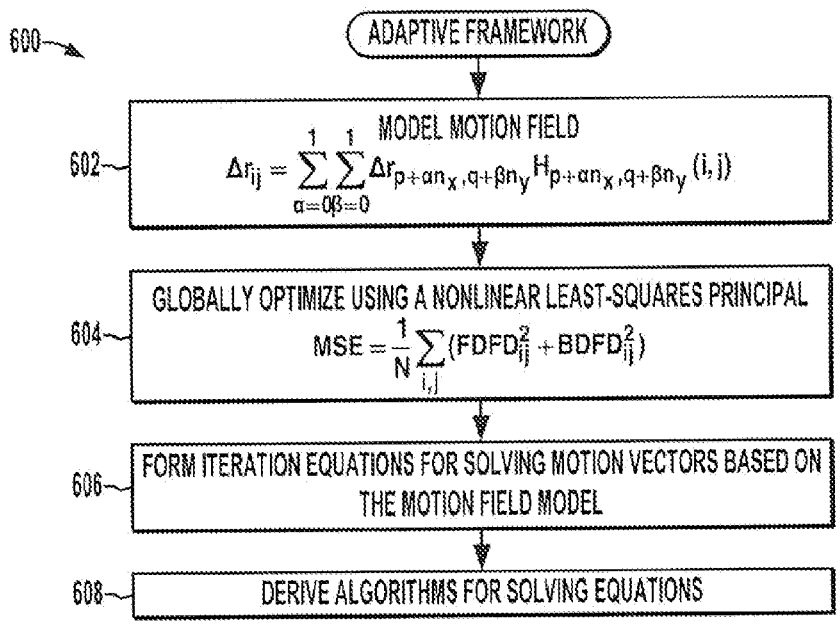
FIG. 10 is a flow diagram illustrating an exemplary adaptive framework for solving a system of equations in accordance with further aspects of the present disclosure.

Referring also to FIG. 10, a unified adaptive framework 600 may be used with simplicity and efficiency for different applications, using techniques to adjust the degree of over-constraint from fully constraint to over-constraint by a block size parameter for solving the nonlinear problem 130. In certain embodiments, the velocity field is expanded by bilinear polynomial functions or two-dimensional B-Spline functions. In order to develop an adaptive framework that allows the estimator to control the resolutions of the displacement field and the degree of over-constraint, and to simplify the computational complexity, bilinear modeling of the displacement field can be used. In general, any two-dimensional function can be approximated by a Lagrange's bilinear function (9):

$$f(x, y) = \sum_{\alpha=0}^{1} \sum_{\beta=0}^{1} f(p + \alpha n_x, q + \beta n_y) H_{p+\alpha n_x, q+\beta n_y}(x, y), \quad (9)$$

where the function $H_{a,b}(x, y)$ is defined by:

$$H_{a,b}(x, y) = \frac{1}{n_x n_y} \begin{cases} (n_x - x + p)(n_y - y + q) & (a = p \cap b = q) \\ (x - p)(n_y - y + q) & (a = p + n_x \cap b = q) \\ (n_x - x + p)(y - q) & (a = p \cap b = q + n_y) \\ (x - p)(y - q) & (a = p + n_x \cap b = q + n_y), \end{cases}$$

and where the parameters of block size $n_x$ and $n_y$ are the sampled spaces of the function f on x and y directions as shown in FIG. 5. The quantized indices p and q are functions of x and y and are given by:

$$\{p, q\} = \{p(x), q(y)\} = \left\{ n_x \left\lfloor \frac{x}{n_x} \right\rfloor, n_y \left\lfloor \frac{y}{n_y} \right\rfloor \right\},$$

where $\lfloor \; \rfloor$ denotes an integer operator. The {p, q} serve as tile indices because the integer operator increments them by unity after an additional $n_x$ or $n_y$ pixels are counted.

Figure 8:
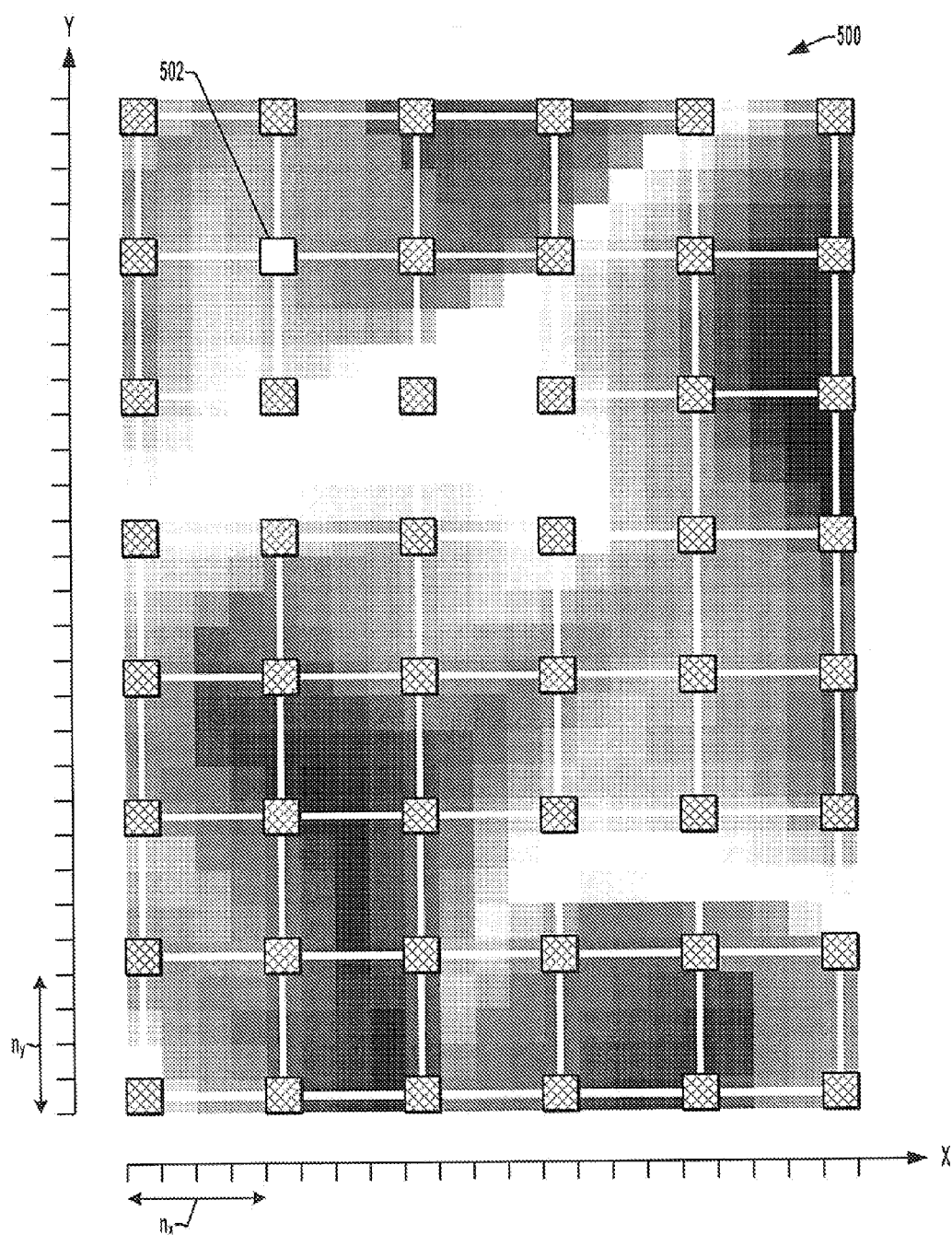
FIGS. 8 and 9 are schematic diagrams illustrating a portion of an exemplary image frame partitioned into blocks.
Figure 9:
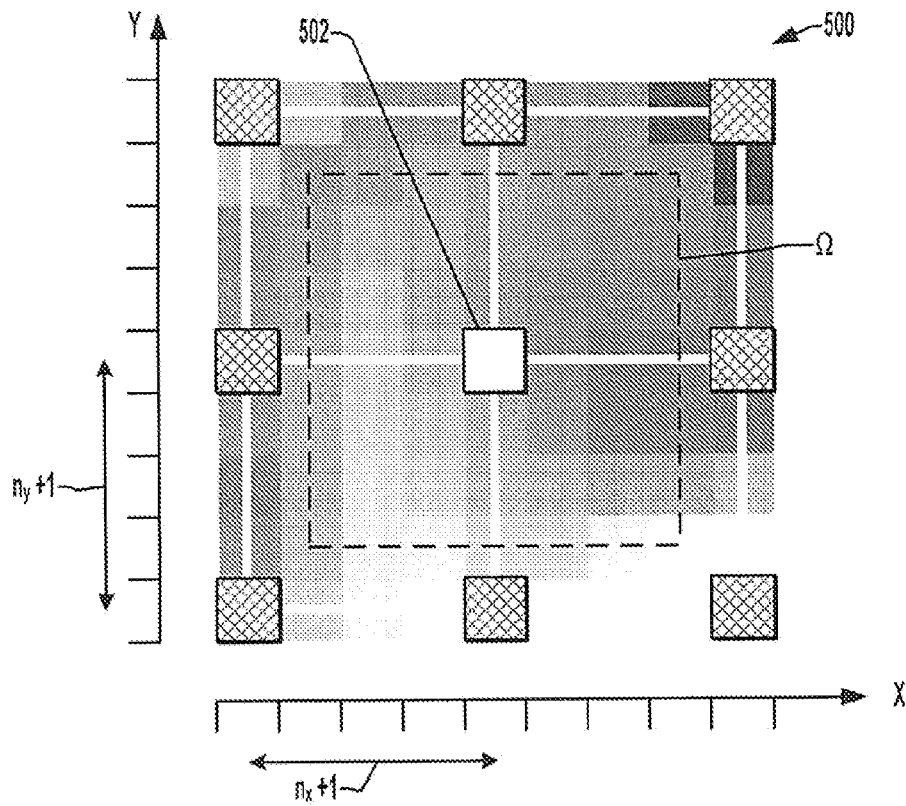

Referring also to FIGS. 8 and 9, in this approach, the image domain 500 is partitioned into a number of sub-domains, or tiles, each which contains an $n_x \times n_y$ array of pixels. In the example of FIGS. 8 and 9, $n=n_x=n_y=4$ pixels per block. Node points (marked with solid squares) of the bilinear approximation are indexed with p and q. As seen in FIG. 9, the pixel locations are partitioned into blocks or tiles with node points 502 at the corners of the blocks (node points 502 indicated as crosshatched or white squares in FIGS. 8 and 9). During the iterations of the process 300, the current value of the block size parameter "n" sets the number of interpolation points $n_x$ and $n_y$ on the "x" and "y" directions, respectively, and FIG. 9 illustrates the blocks in a local domain Ω proximate a particular node 502 in the image 500.

The displacement field is modeled at 602 in the adaptive framework 600 of FIG. 10. Defining a function $f_{ij}(t)=f(i, j, t)$ with discrete variables i and j, the displacement fields $\Delta r_{ij}(t_1)$ are represented as two-dimensional bilinear functions controlled by a smaller number of displacement vector estimates $\Delta r_{pq}(t_1)$ which lie on a coarser node point in grid. The two displacement components in an image scene can be expressed by the following bilinear polynomials:

$$\Delta r_{ij} = \sum_{\alpha=0}^{1}\sum_{\beta=0}^{1} \Delta r_{p+\alpha n_x, q+\beta n_y} H_{p+\alpha n_x, q+\beta n_y}(i,j), \quad (10)$$

where the displacement vector $\Delta r_{ij} = \Delta r_{ij}(t_1) = (\Delta x_{ij}, \Delta y_{ij})$. In the special case when block size is unity ($n_x = n_y = 1$), $\Delta r_{ij} \equiv \Delta r_{pq}$ for all indices i and j. All displacement vectors $\Delta r_{ij}$ can be calculated with the bilinear function using the displacement on node points expressed as $\Delta r_{pq}$. Displacement vectors $\Delta r_{ij}$ off-node are no longer independent variables (for over-constrained case: $n = n_x = n_y > 1$) except on node points (or a fully constrained case: $n=1$).

In this regard, the block (tile) size parameter $n \geq 1$ can be adjusted to control the number of interpolation points related to the resolution of the displacement field and the degree of the over-constraint. When the parameter n is equal to one, all node points and pixel positions are overlapped together and the system is fully constrained. The system is over-constrained if the parameter n is greater than one.

A nonlinear least-squares model can also be used at 604 in FIG. 10. The displacement field $\Delta x_{pq}$ and $\Delta y_{pq}$ can be resolved when the parameters $n \geq 1$ from the fully or over-constraint system using the nonlinear least-squares model. The presence of possible quantization errors and noise in the intensity measurements suggest the FDFD and BDFD equations in (8) are never identically zero. However, a set of $\Delta r_{ij}$ can be selected for which it is minimized in a least-squares sense. A Mean Square Error (MSE) function that is a sum of the total errors of the FDFD and BDFD in (8) is given by:

$$MSE = \frac{1}{N} \sum_{i,j} (FDFD_{ij}^2 + BDFD_{ij}^2),$$

where the range of i and j are the entire ($N = N_x \times N_y$) image pixel domain (i $\in$ [0, $N_x-1$], j $\in$ [0, $N_y-1$], and the weighting factor can be equal to unity in this case). By minimizing the cost function with respect to the displacement components $\Delta x_{kl}$ and $\Delta y_{kl}$ as variables for given indices k and l on all node points, a fully or over-constrained system of equations (11) for the displacement may be written as follows:

$$\sum_{i,j \in \Omega_{kl}} FDFD_{ij}\left\{\frac{\partial FDFD_{ij}}{\partial \Delta x_{kl}}, \frac{\partial FDFD_{ij}}{\partial \Delta y_{kl}}\right\} + \quad (11)$$

$$\sum_{i,j \in \Omega_{k'l'}} BDFD_{ij}\left\{\frac{\partial BDFD_{ij}}{\partial \Delta x_{kl}}, \frac{\partial BDFD_{ij}}{\partial \Delta y_{kl}}\right\} = 0.$$

In addition, the summation domain is reduced from the entire image plane to only a local region $\Omega_{kl}$ or $\Omega_{k'l'}$, so that:

$$\sum_{i,j} \rightarrow \sum_{i,j \in \Omega_{\alpha\beta}} = \sum_{i=\alpha-n_x+1}^{\alpha+n_x-1} \sum_{j=\beta-n_y+1}^{\beta+n_y-1},$$

where $\alpha = \{k, k'\}$ and $\beta = \{l, l'\}$, and regions of the summation coverage k' and l' are defined by $\{k', l'\} = \{\lfloor k+\Delta x_{kl}\rfloor, \lfloor l+\Delta y_{kl}\rfloor\}$. To obtain equation (14) below, the following is used:

$$\frac{\partial \Delta x_{ij}}{\partial \Delta x_{kl}} = \frac{\partial \Delta y_{ij}}{\partial \Delta y_{kl}} = \sum_{\alpha=0}^{1}\sum_{\beta=0}^{1} H_{kl}(i,j)\delta_{k,p+\alpha n_x}\delta_{l,q+\beta n_y},$$

where $\delta_{ij}$ is the Kronecker-Delta symbol.

Equations (11) obtained by the nonlinear least-squares model are a set of nonlinear system equations with all displacement vectors $\Delta x_{pq}$ and $\Delta y_{pq}$ on node points as variables. To solve the nonlinear system equations (11), an iterative equation can be formulated at 606 in FIG. 10 based on Gauss-Newton and Levenberg-Marquardt methods. The displacement vectors $\Delta x_{kl}$ and $\Delta y_{kl}$ and their surrounding nearest neighbors are the only members now contained in the summations in equation (11). To solve these sparse nonlinear system of equations (11), the FDFD and BDFD can be expanded in a Taylor series using the Gauss-Newton method:

$$\{FDFD_{ij}^{(m+1)}, BDFD_{ij}^{(m+1)}\} \approx$$

$$\{FDFD_{ij}^{(m)}, BDFD_{ij}^{(m)}\} + +\left\{\frac{\partial FDFD_{ij}^{(m)}}{\partial \Delta x_{kl}^{(m)}}, \frac{\partial BDFD_{ij}^{(m)}}{\partial \Delta x_{kl}^{(m)}}\right\}$$

$$(\Delta x_{kl}^{(m+1)} - \Delta x_{kl}^{(m)}) + +\left\{\frac{\partial FDFD_{ij}^{(m)}}{\partial \Delta y_{kl}^{(m)}}, \frac{\partial BDFD_{ij}^{(m)}}{\partial \Delta y_{kl}^{(m)}}\right\}(\Delta y_{kl}^{(m+1)} - \Delta y_{kl}^{(m)}),$$

where m is a iteration index, and $$\{FDFD_{ij}^{(m)}, BDFD_{ij}^{(m)}\} = \{FDFD_{ij}(\Delta x_{pq}^{(m)}, \Delta y_{pq}^{(m)}),$$
$$BDFD_{ij}(\Delta x_{pq}^{(m)}, \Delta y_{pq}^{(m)})\}.$$

Utilizing these expansions and the above equations (11), the following iterative equations can be used for all indices k and l:

$$\begin{pmatrix}\Delta x_{kl}^{(m+1)} \\ \Delta y_{kl}^{(m+1)}\end{pmatrix} = \begin{pmatrix}\Delta x_{kl}^{(m)} \\ \Delta y_{kl}^{(m)}\end{pmatrix} - \begin{pmatrix}(\lambda+1)a_{11} & a_{12} \\ a_{12} & (\lambda+1)a_{22}\end{pmatrix}^{-1}\begin{pmatrix}b_1 \\ b_2\end{pmatrix}, \quad (12)$$

where $$\begin{cases} a_{11} = \sum_{i,j \in \Omega_{kl}}\left(\frac{\partial FDFD_{ij}^{(m)}}{\partial \Delta x_{kl}^{(m)}}\right)^2 + \sum_{i,j \in \Omega_{kl}^{(m)}}\left(\frac{\partial BDFD_{ij}^{(m)}}{\partial \Delta x_{kl}^{(m)}}\right)^2 \\ a_{12} = \sum_{i,j \in \Omega_{kl}}\frac{\partial FDFD_{ij}^{(m)}}{\partial \Delta x_{kl}^{(m)}}\frac{\partial FDFD_{ij}^{(m)}}{\partial \Delta y_{kl}^{(m)}} + \sum_{i,j \in \Omega_{kl}^{(m)}}\frac{\partial BDFD_{ij}^{(m)}}{\partial \Delta x_{kl}^{(m)}}\frac{\partial BDFD_{ij}^{(m)}}{\partial \Delta y_{kl}^{(m)}} \\ a_{22} = \sum_{i,j \in \Omega_{kl}}\left(\frac{\partial FDFD_{ij}^{(m)}}{\partial \Delta y_{kl}^{(m)}}\right)^2 + \sum_{i,j \in \Omega_{kl}^{(m)}}\left(\frac{\partial BDFD_{ij}^{(m)}}{\partial \Delta y_{kl}^{(m)}}\right)^2, \end{cases}$$

$$\begin{cases} b_1 = \sum_{i,j \in \Omega_{kl}} FDFD_{ij}^{(m)}\frac{\partial FDFD_{ij}^{(m)}}{\partial \Delta x_{kl}^{(m)}} + \sum_{i,j \in \Omega_{kl}^{(m)}} BDFD_{ij}^{(m)}\frac{\partial BDFD_{ij}^{(m)}}{\partial \Delta x_{kl}^{(m)}} \\ b_2 = \sum_{i,j \in \Omega_{kl}} FDFD_{ij}^{(m)}\frac{\partial FDFD_{ij}^{(m)}}{\partial \Delta y_{kl}^{(m)}} + \sum_{i,j \in \Omega_{kl}^{(m)}} BDFD_{ij}^{(m)}\frac{\partial BDFD_{ij}^{(m)}}{\partial \Delta y_{kl}^{(m)}}, \end{cases}$$

$$\sum_{i,j \in \Omega_{kl}^{(m)}} = \sum_{i=k^{(m)}-n_x+1}^{k^{(m)}+n_x-1}\sum_{j=l^{(m)}-n_y+1}^{l^{(m)}+n_y-1},$$

and $$\{k^{(m)}, l^{(m)}\} = \{\lfloor k + \Delta x_{kl}^{(m)}\rfloor, \lfloor l + \Delta y_{kl}^{(m)}\rfloor\}.$$

The parameter λ≥0 is a Levenberg-Marquardt factor that is adjusted at each iteration to guarantee that the MSE is convergent. A smaller value of the factor λ can be used, bringing the algorithm closer to the Gauss-Newton method with second order convergence. This Levenberg-Marquardt method can improve converge properties greatly in practice and has become the standard of nonlinear least-squares routines.

All displacement vectors $\Delta x_{pq}$ and $\Delta y_{pq}$ on node points can be obtained by iterating the equations in (12), and the displacement vectors $\Delta x_{ij}$ and $\Delta y_{ij}$ off node points (for n>1) can be calculated by the bilinear functions in (10). Ultimately, all displacement vectors $\Delta r$ can be determined, and an optimum solution can be achieved over the large-scale image. In addition, the block size parameter n≥1 can be adjusted to control the number of interpolation points within a tile, to resolve the displacement field, and to control the degree of the over-constraint.

An optimized motion-compensated predication is also possible. In particular, using an additionally constrained system to estimate motion field, the inverse problem has previously been addressed by minimizing an objective function with a weighting (penalty) parameter. However, there are two major issues with this use of a weighting parameter. The first is the determination of the optimized weighting parameter, and several different values of the weighting parameter have been proposed. However, it is difficult to find a single optimal value of the parameter for realistic applications if the ground truth flow field is unknown. The second issue is that the Peak Signal-to-Noise Ratio (PSNR):

$$PSNR = 10\log_{10}\left(\frac{255^2}{MSE}\right),$$

is not optimized by minimizing the objective function with the weighting parameter. The estimated flow field by this approach cannot always lead to an optimal Motion-Compensated prediction or Interpolation (MCI) image for applications of video compression.

As seen above, however, the iteration equations (12) are derived based on the least-squares principle that leads directly to a solution of the displacement field 140 with a minimized target function MSE or a maximized PSNR (An average PSNR for the Forward and Backward MCP (FMCP and BMCP)). Since both FDFD and BDFD are equivalent physical quantities, the target function PSNR is an optimized function without any additional parameters. Therefore the MCP image using the estimated displacement field 140 based on the fully constrained system 130 is believed to be optimized.

The adjustable block size approach using smaller number of displacement components on nodes to interpolate a full density displacement field 140 (for n>1 case) provides a powerful capability for different applications in both computer vision and remote sensing fields. If the block size shown in FIG. 8 is n×n with dimension $N_x \times N_y$ images, then the number of transmitted or stored motion vectors for both proposed and block-matching is estimators are equal to $[(N_x-1)/n+1]\times[(N_y-1)/n+1]$ and $(N_x/n)\times(N_y/n)$, respectively. Using almost the same number of the displacement vectors $\Delta r$ in a fixed block size for both approaches, the current framework (the displacement field with $C^1$ continuity obtained by global optimal strategies) can provide much higher accurate performance than the block-matching algorithm (the displacement field with $C^0$ continuity obtained by local searching strategies) which is the currently adopted standard for video coding.

With respect to iteration algorithms, certain embodiments of the process 300 and apparatus 100 can start from a set of preset initial values of the displacement field $\Delta r^{(0)}$ at time $t_1$, then the Motion Vector Solver 110b solves the correspondence field $\Delta r^{(0)}(t_2)$ using all the component equations (8) numerically. An iteration step based on these two displacement fields at time $t_1$ and $t_2$ and the iterative equations in (12) can be performed. Furthermore, employing a principle similar to that of the Gauss-Seidel iteration algorithm, updated values of $\Delta x_{pq}^{(m)}$ and $\Delta y_{pq}^{(m)}$ can be used on the right-hand side of equation (12) as soon as they become available during the iteration processing. In certain embodiments, all initial displacement field vectors are preset to be equal to 0.01, and the initial Levenberg-Marquardt factor λ is set to 0.001 and is multiplied by ten in each step if the iteration is not convergent.

The FDFD and BDFD equations on each pixel include two motion-compensated predictions $l(i\pm\Delta x_{ij}, j\pm\Delta y_{ij}, t_{\{2,1\}})$ with variables that may be out of the position on pixels in an image scene. In order to compute the motion-compensated predictions, the general bilinear interpolation function in (4) is utilized for this computation as follows:

$$I(i\pm\Delta x_{ij}, j\pm y_{ij}, t_{\{2,1\}}) = \sum_{\alpha=0}^{1}\sum_{\beta=0}^{1} I_{p+\alpha,q+\beta}(t_{\{2,1\}})H_{p+\alpha,q+\beta}(i\pm\Delta x_{ij}, j\pm\Delta y_{ij}),$$

where the function H is evaluated when $n_x=n_y=1$, and $\{p, q\}=\{p(i\pm\Delta x_{ij}), q(j\pm\Delta y_{ij})\}$.

The proposed displacement estimation approach leads to a nonlinear system of equations that may have multiple solutions depending on texture morphology in an image sequence. For example, to estimate a displacement field within a featureless region, the displacement field may not be unique because the initial and final positions of a particular particle cannot be physically determined. Even in a texture-rich environment, the realistic motion fields may have multiple possibilities, which satisfy the same equations and are consistent with the same physical observation. The multiple solutions in the inverse problem by solving a nonlinear system are congruent with this physical property.

The inventor has further appreciated that in order to approach a globally minimized solution using the iteration equations (12), an algorithm of PROC that adapts a variable resolution of the displacement structure during the iterations can be employed in this algorithm. In certain embodiments, an initial block size parameter $n_0$ is selected to be greater than a preset value of the block size n at initial iteration, and it reaches a preset value of n at the end iteration. In certain embodiments, the displacement field can be regularized by changing the block size parameter n from a larger value (higher degree of over-constraint) to a smaller one (lower degree of over-constraint) by one every Nth iteration until it approaches a preset value of n. The inventor has appreciated that the PROC algorithm is helpful for seeking a flow field in which each vector is consistent with its neighbors.

As seen in FIGS. 4 and 5 above, either forward or backward DVI equations can be used in the equation set 130. Algorithms are then derived at 608 in FIG. 9 for solving the DVI equations. Two components of forward and backward DVI equations between time $t_1$ and $t_2$ are given by the following equations (A1) and (A2):

$$\begin{cases} \Delta x_{ij}(t_2) + \Delta x(i + \Delta x_{ij}(t_2), j + \Delta y_{ij}(t_2), t_1) = 0 \\ \Delta y_{ij}(t_2) + \Delta y(i + \Delta x_{ij}(t_2), j + \Delta y_{ij}(t_2), t_1) = 0, \end{cases} \quad (A1)$$

and $$\begin{cases} \Delta x(x, y, t_1) + \Delta x(x + \Delta x(x, y, t_1), y + \Delta y(x, y, t_1), t_2) = 0 \\ \Delta y(x, y, t_1) + \Delta y(x + \Delta x(x, y, t_1), y + \Delta y(x, y, t_1), t_2) = 0. \end{cases} \quad (A2)$$

If the conservative velocity field $\{\Delta x_{ij}(t_1), \Delta y_{ij}(t_1)\}$ at time $t_1$ is given or solved, then the correspondence field $\{\Delta x_{ij}(t_2), \Delta y_{ij}(t_2)\}$ at time $t_2$ can be determined (or vice versa) by all component equations in (A1) or (A2). Thus, the processor 110 of the estimator 100 is programmed to solve the equation set 130 using the forward and backward displaced frame difference equations in combination with either the forward DVD equations (A1) (FIG. 4) or the backward DVD equations (A2) (FIG. 5) using the first and second image frames $12_{t_1}$ and $12_{t_2}$ to estimate the displacement field 140 describing displacement vectors $\Delta r_{ij}(t_1)$ or $\Delta r_{ij}(t_2)$ for pixel locations (i, j) at one of the first and second times ($t_1$, $t_2$) using known or estimated displacement field values at the other of the first and second times ($t_1$, $t_2$).

In one example, numerically solving the equation set 130 at time $t_2$ using equations (A1) or (A2) by the Motion Vector Solver 110*b* if the velocity $\{\Delta x_{ij}(t_1), \Delta y_{ij}(t_1)\}$ or $\{\Delta x_{ij}(t_2), \Delta y_{ij}(t_2)\}$ are given involves expanding the field by a bilinear polynomial function, where a bilinear expression of a two-dimensional displacement field is given by equation (10).

The forward and backward DVI equations (A1) and (A2) are implicit recursive functions of the fields $(\{\Delta x_{ij}(t_1), \Delta y_{ij}(t_1)\})$ at time t and $t_1$. Three methods for solving the matrix field $\{\Delta x_{ij}(t_2), \Delta y_{ij}(t_2)\}$ are described below for the case in which the matrix field $\{\Delta x_{ij}(t_1), \Delta y_{ij}(t_1)\}$ are given, and it will be appreciated that the converse problem can be solved by similar techniques for solving the equation set 130 at time $t_1$ where the matrix field is given at time $t_2$.

An interpolation method with a searching algorithm can be used to solve the equation set 130 using either of the forward DVI equations (FIG. 4) or the backward DVI equations (FIG. 5). In this approach, a lookup table of off site velocity field at time t with variables that are out of the position on pixels (x≠i and y≠j) in an image is generated using the given matrix field $\{\Delta x_{ij}(t_1), \Delta y_{ij}(t_1)\}$. The lookup table in one example is an array of records, where each record contains four parameters: position coordinates $x=i+\Delta x_{ij}(t_1)$ and $y=j+\Delta y_{ij}(t_1)$, and the matrix values of $\Delta x_{ij}(t_1)$ and $\Delta y_{ij}(t_1)$ for all $i \in [0,N_x-1] \cap j \in [0,N_y-1]$. All the values of the matrix field $\Delta x_{ij}(t_2)$ and $\Delta y_{ij}(t_2)$ on the pixel points are then evaluated by a bilinear interpolation method and a searching algorithm. The searching algorithm finds three or four available values of the field $\Delta x(x, y, t_2)$ and $\Delta y(x, y, t_2)$ in the lookup table for all nearest points around the given point (i, j).

Another technique involves solving the forward DVI equations (A1) by Newton-Raphson method, such as a damped Newton-Raphson method. Assuming that the forward DVI equations (A1) are nonlinear functions with variables $\Delta x_{ij}(t_2)$ and $\Delta y_{ij}(t_2)$, the system of equations 130 can be solved by a Newton-Raphson method. Two-component nonlinear system of equations with variable $\Delta x_{ij}(t_2)$ and $\Delta y_{ij}(t_2)$ are given by:

$$\begin{cases} \varepsilon_1(\Delta x_{ij}(t_2), \Delta y_{ij}(t_2)) = \Delta x_{ij}(t_2) + \Delta x(i + \Delta x_{ij}(t_2), j + \Delta y_{ij}(t_2), t_1) = 0 \\ \varepsilon_2(\Delta x_{ij}(t_2), \Delta y_{ij}(t_2)) = \Delta y_{ij}(t_2) + \Delta y(i + \Delta x_{ij}(t_2), j + \Delta y_{ij}(t_2), t_1) = 0. \end{cases}$$

Using the bilinear function in the above equation (A3) to expand the given field at time $t_1$, all off site values (with non-integer value variables) of the given field at time $t_1$ are evaluated by the function (10). Since both indexes p and q are functions of the variables $\Delta x_{ij}(t_2)$ and $\Delta y_{ij}(t_2)$, the variables $\Delta x_{ij}(t_2)$ and $\Delta y_{ij}(t_2)$ cannot be solved directly from the above equations. However, these equations are quasi-quadratic, and thus can be solved by a damped Newton-Raphson method. Iteration equations for solving the matrix field at time t for all i and j are given by:

$$\begin{pmatrix} \Delta x_{ij}^{(m+1)}(t_2) \\ \Delta y_{ij}^{(m+1)}(t_2) \end{pmatrix} = \begin{pmatrix} \Delta x_{ij}^{(m)}(t_2) \\ \Delta y_{ij}^{(m)}(t_2) \end{pmatrix} - \begin{pmatrix} \frac{\partial \varepsilon_1^{(m)}}{\partial \Delta x_{ij}^{(m)}(t_2)} & \frac{\partial \varepsilon_1^{(m)}}{\partial \Delta y_{ij}^{(m)}(t_2)} \\ \frac{\partial \varepsilon_2^{(m)}}{\partial \Delta x_{ij}^{(m)}(t_2)} & \frac{\partial \varepsilon_2^{(m)}}{\partial \Delta y_{ij}^{(m)}(t_2)} \end{pmatrix}^{-1} \begin{pmatrix} \varepsilon_1^{(m)} \\ \varepsilon_2^{(m)} \end{pmatrix}, \quad (A3)$$

where m is an iteration index. All derivatives with respect variables $\Delta x_{ij}(t_2)$ and $\Delta y_{ij}(t_2)$ in the above equations can be evaluated by the bilinear function (10). Two index variables p and q in function (10) are integer function of the variables $\Delta x_{ij}(t_2)$ and $\Delta y_{ij}(t_2)$, but the derivative of the integer function is equal to zero, and thus:

$$\begin{cases} \frac{\partial \Delta x_{pq}(t_1)}{\partial \Delta x_{ij}^{(m)}(t_2)} = \frac{\partial \Delta x_{pq}(t_1)}{\partial \Delta y_{ij}^{(m)}(t_2)} \equiv 0 \\ \frac{\partial \Delta y_{pq}(t_1)}{\partial \Delta x_{ij}^{(m)}(t_2)} = \frac{\partial \Delta y_{pq}(t_1)}{\partial \Delta y_{ij}^{(m)}(t_2)} \equiv 0. \end{cases}$$

A third approach can be used to solve equation set 130 employing the backward DVD equations (A2) (FIG. 5) by a New-Raphson method. In order to solve the velocity field $\Delta x_{ij}(t_2)$ and $\Delta y_{ij}(t_2)$ in equation (A2), the equation can be rewritten as shown in the following equation (A4):

$$\begin{cases} \Delta x(x_1, y_1, t_1) + \Delta x(x_1 + \Delta x(x_1, y_1, t_1), y_1 + \Delta y(x_1, y_1, t_1), t_2) = 0 \\ \Delta y(x_1, y_1, t_1) + \Delta y(x_1 + \Delta x(x_1, y_1, t_1), y_1 + \Delta y(x_1, y_1, t_1), t_2) = 0. \end{cases} \quad (A4)$$

where $x_1$ and $y_1$ are two components of a position vector. Two new index variables are introduced as follows:

$$\begin{cases} i = x_1 + \Delta x(x_1, y_1, t_1) \\ j = y_1 + \Delta y(x_1, y_1, t_1), \end{cases} \quad (A5)$$

or $$\begin{cases} e_1 = x_1 + \Delta x(x_1, y_1, t_1) - i = 0 \\ e_2 = y_1 + \Delta y(x_1, y_1, t_1) - j = 0. \end{cases}$$

The above equations become:

$$\begin{cases} \Delta x_{ij}(t_2) = -\Delta x(x_1, y_1, t_1) \\ \Delta y_{ij}(t_2) = -\Delta y(x_1, y_1, t_1). \end{cases} \quad (A6)$$

All the displacement vector fields $\Delta x_{ij}(t_2)$ and $\Delta y_{ij}(t_2)$ in equation (A6) on all pixel points (i, j) can be determined by off-site field at time $t_1$ after all position coordinates $x_1$ and $y_1$ are solved from equations (A5). According to the bilinear expansion in equation (A3), the displacement field at time $t_1$ can be expressed by:

$$\{\Delta x(x, y, t_1), \Delta y(x, y, t_1)\} =$$

$$\sum_{\alpha=0}^{1} \sum_{\beta=0}^{1} \{\Delta x_{p+\alpha n_x, q+\beta n_y}(t_1), \Delta y_{p+\alpha n_x, q+\beta n_y}(t_1)\} H_{p+\alpha n_x, q+\beta n_y}(x, y).$$

Iterative equations for solving position coordinate $x_1$ and $y_1$ are given by $$\begin{pmatrix} x_1^{(m+1)} \\ y_1^{(m+1)} \end{pmatrix} = \begin{pmatrix} x_1^{(m)} \\ y_1^{(m)} \end{pmatrix} - \begin{pmatrix} \frac{\partial e_1^{(m)}}{\partial x_1^{(m)}} & \frac{\partial e_1^{(m)}}{\partial y_1^{(m)}} \\ \frac{\partial e_2^{(m)}}{\partial x_1^{(m)}} & \frac{\partial e_2^{(m)}}{\partial y_1^{(m)}} \end{pmatrix}^{-1} \begin{pmatrix} e_1^{(m)} \\ e_2^{(m)} \end{pmatrix}.$$

Using the property of the integer function that the derivative is zero yields:

$$\begin{cases} \frac{\partial \Delta x_{pq}}{\partial x_1} = \frac{\partial \Delta x_{pq}}{\partial y_1} \equiv 0 \\ \frac{\partial \Delta y_{pq}}{\partial x_1} = \frac{\partial \Delta y_{pq}}{\partial y_1} \equiv 0. \end{cases}$$

All position coordinate $x_1$ and $y_1$ for given indexes i and j, and the displacement field at time $t_1$ can be solved by only a few iteration steps, because these equations are quasi-quadratic for this motion model.

In certain implementations, the Motion Vector Solver 110b is programmed to solve the forward displacement vector invariant equations (FIG. 4) in the equation set 130 by a damped Newton-Raphson method using the above iteration equations (A3) for solving the displacement field at time $t_2$.

Figure 11:
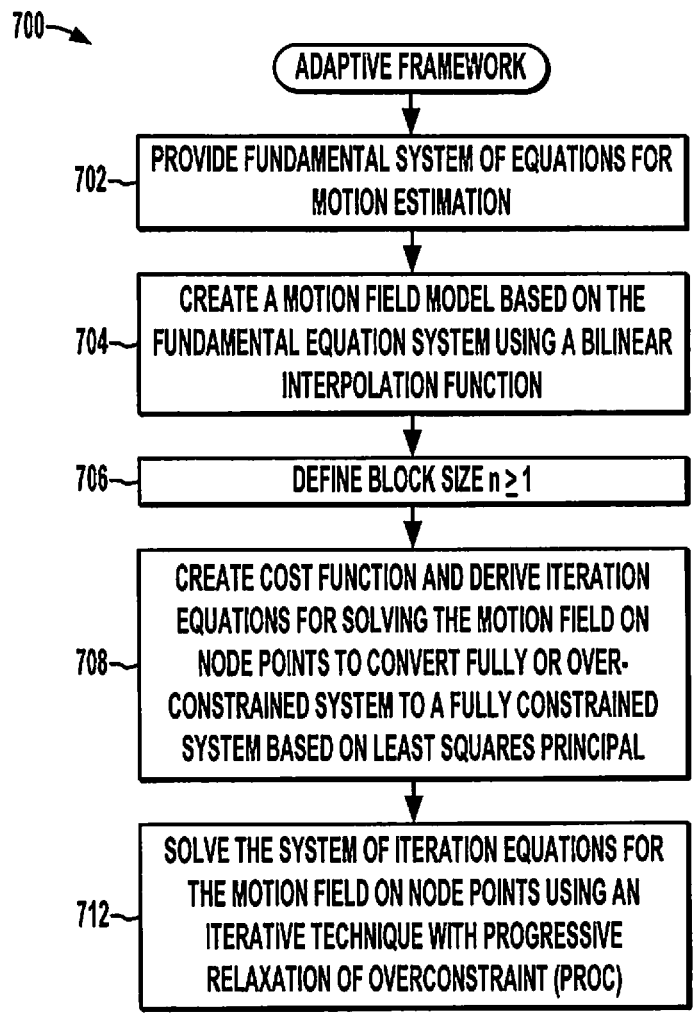
FIG. 11 is a detailed flow diagram illustrating an adaptive process or framework for solving a system of equations for motion estimation in accordance with further aspects of the present disclosure.

Referring now to FIG. 11, an adaptive framework or process 700 is illustrated for solving a system of equations for motion estimation in accordance with further aspects of the present disclosure. At 702 in FIG. 11, a fundamental system of equations is provided for motion estimation. The process 700 can be used for motion estimation equation systems that are linear or nonlinear, and can be applied where the fundamental motion estimation equation system is under-constrained, over-constrained and/or fully constrained. Moreover, process 700 can be used for estimating any type or form of motion field, including without limitation displacement fields and/or velocity fields. For instance, the fundamental system can be provided at 702 as the DFD equations discussed above, or the fundamental equation system can be provided in the form of optical flow equations or heat flow equations and other nonlimiting embodiments. Modeling is then performed at 704, in which a motion field model is created based on the fundamental equation system using a bilinear interpolation function (e.g., 134 above). In this regard, the inventor has appreciated that for each pixel in an image, there may be one equation, or there may be two or more equations, and that motion vectors at individual pixel points are dependent upon motion vectors for neighboring node points. At 706 in FIG. 11, the block size is defined, where "n" is set to an integer value greater than or equal to 1 so that the number of motion vectors on node points is greater than the number of pixel points. In this manner, motion vectors on node points can be solved without solving all the motion fields for each pixel point. Thus the motion field for node points can be solved using the model (bilinear interpolation function). At 708 a cost function is created based on a linear or nonlinear least-squares principle. In addition, iteration equations are derived at 708 for solving the motion field on node points to convert a fully or over-constrained system to a fully constrained system based on a linear or nonlinear least-squares principle. In this regard, the fundamental equation system at 702 may be over-constrained, fully constrained and/or under-constrained, but the modeling at 704 causes the modeled motion field system to be fully constrained or over-constrained based on the block size definition at 706. Moreover, the inventor has appreciated that using the nonlinear least squares technique at 708, a fully constrained system of iteration equations can be created or derived for solving the motion field on node points, for example, using a Gauss-Newton method or Levenberg-Marquardt technique, where the iteration equations are based on the fundamental equation system provided at 702. At 712, the system of iteration equations is solved for the motion field on node points using an iterative technique with progressive relaxation of over-constraint (PROC), for instance, using a processor.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (processor-executed processes, assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for processing an image sequence, the method comprising:
   providing a fully constrained nonlinear equation set including:
      a forward displaced frame difference equation,
      a backward displaced frame difference equation, and
      a plurality of displacement vector invariant equations;
   receiving an input image sequence comprising a pair of image frames individually including multidimensional image data corresponding to a plurality of pixel locations at different times; and
   using at least one processor, solving the equation set using an iteration equation and the image data of the pair of image frames to determine a displacement field describing displacement vectors at pixel locations at one time by solving displacement field values at another time from the plurality of displacement vector invariant equations,
   wherein the multidimensional image data of the pair of frames is two-dimensional;

wherein the forward displaced frame difference equation is
$l(i+\Delta x_{ij}(t_1), j+\Delta y_{ij}(t_1), t_2)-l_{ij}(t_1)=0$;
wherein the backward displaced frame difference equation is $l_{ij}(t_2)-l(i+\Delta x_{ij}(t_2), j+\Delta y_{ij}(t_2), t_1)$; and
wherein the plurality of displacement vector invariant equations consists of:
a first forward displacement vector invariant equation, being $\Delta x_{ij}(t_2)+\Delta x(i+\Delta x_{ij}(t_2), j+\Delta y_{ij}(t_2), t_1)=0$, and
a second forward displacement vector invariant equation, being $\Delta y_{ij}(t_2)+\Delta y(i+\Delta x_{ij}(t_2), j+\Delta y_{ij}(t_2), t_1)=0$;
where l is an intensity of the image data; i is a pixel index in a horizontal direction x; j is a pixel index in a vertical direction y orthogonal to the horizontal direction x; $t_1$ is the one frame time; $t_2$ is the other frame time; $\Delta x_{ij}(t_1)$ is a displacement vector at pixel location i and j at the one time in the horizontal direction; $\Delta x_{ij}(t_2)$ is a displacement vector at pixel location i and j at the other time in the horizontal direction; $\Delta y_{ij}(t_1)$ is a displacement vector at pixel location i and j at the one time in the vertical direction; and $\Delta y_{ij}(t_2)$ is a displacement vector at pixel location i and j at the other time in the vertical direction.

2. The method of claim 1:
wherein solving the equation set comprises solving the forward displacement vector invariant equations in the equation set using a lookup table of records at a time t that are off indexed pixel locations, with each record including position coordinates $x=i+\Delta x_{ij}(t_1)$ and $y=j+\Delta y_{ij}(t_1)$, and matrix values of $\Delta x_{ij}(t_1)$ and $\Delta y_{ij}(t_1)$ for all $i\in[0,N_x-1]\cap j\in[0,N_y-1]$; and
wherein solving the equation set comprises, for all pixel locations, evaluating all the values of the matrix field $\Delta x_{ij}(t_2)$ and $\Delta y_{ij}(t_2)$ on a given pixel location by a bilinear interpolation method and a searching algorithm that finds three or four available values of the field $\Delta x(x, y, t_2)$ and $\Delta y(x, y, t_2)$ in the lookup table for all nearest points around the given pixel location.

3. The method of claim 1, wherein solving the equation set comprises solving the forward displacement vector invariant equations in the equation set by a damped Newton-Raphson method using iteration equations for solving the matrix field at time $t_2$ for all pixel locations i and j, the iteration equations being given by:

$$\begin{pmatrix} \Delta x_{ij}^{(m+1)}(t_2) \\ \Delta y_{ij}^{(m+1)}(t_2) \end{pmatrix} = \begin{pmatrix} \Delta x_{ij}^{(m)}(t_2) \\ \Delta y_{ij}^{(m)}(t_2) \end{pmatrix} - \begin{pmatrix} \frac{\partial \varepsilon_1^{(m)}}{\partial \Delta x_{ij}^{(m)}(t_2)} & \frac{\partial \varepsilon_1^{(m)}}{\partial \Delta y_{ij}^{(m)}(t_2)} \\ \frac{\partial \varepsilon_2^{(m)}}{\partial \Delta x_{ij}^{(m)}(t_2)} & \frac{\partial \varepsilon_2^{(m)}}{\partial \Delta y_{ij}^{(m)}(t_2)} \end{pmatrix}^{-1} \begin{pmatrix} \varepsilon_1^{(m)} \\ \varepsilon_2^{(m)} \end{pmatrix}$$

where m is an iteration index; and
wherein solving the equation set comprises solving evaluating derivatives with respect variables $\Delta x_{ij}(t_2)$ and $\Delta y_{ij}(t_2)$ in the iteration equations by the following bilinear function:

$$\{\Delta x(x, y, t_1), \Delta y(x, y, t_1)\} =$$
$$\{\Delta x_{pq}(t_1), \Delta y_{pq}(t_1)\}\frac{(n_x-x+p)(n_y-y+q)}{n_x n_y} + +\{\Delta x_{p+n_x,q}(t_1), \Delta y_{p+n_x,q}(t_1)\}$$
$$\frac{(x-p)(n_y-y+q)}{n_x n_y} + +\{\Delta x_{p,q+n_y}(t_1), \Delta y_{p,q+n_y}(t_1)\}$$
$$\frac{(n_x-x+p)(y-q)}{n_x n_y} + +\{\Delta x_{p+n_x,q+n_y}(t_1), \Delta y_{p+n_x,q+n_y}(t_1)\}\frac{(x-p)(y-q)}{n_x n_y}$$

-continued
and
$$\{p, q\} = \left\{ n_x \left\lfloor \frac{x}{n_x} \right\rfloor, n_y \left\lfloor \frac{y}{n_y} \right\rfloor \right\},$$

where $\lfloor \ \rfloor$ denotes an integer operator, and $n_x$ and $n_y$ are a number of interpolation points on x and y directions.

4. A method for processing an image sequence, the method comprising:
providing a fully constrained nonlinear equation set including:
a forward displaced frame difference equation,
a backward displaced frame difference equation, and
a plurality of displacement vector invariant equations;
receiving an input image sequence comprising a pair of image frames individually including multidimensional image data corresponding to a plurality of pixel locations at different times; and
using at least one processor, solving the equation set using an iteration equation and the image data of the pair of image frames to determine a displacement field describing displacement vectors at pixel locations at one time by solving displacement field values at another time from the plurality of displacement vector invariant equations,
wherein the multidimensional image data of the pair of frames is two-dimensional;
wherein the forward displaced frame difference equation is $l(i+\Delta x_{ij}(t_1), j+\Delta y_{ij}(t_1), t_2)-l_{ij}(t_1)=0$;
wherein the backward displaced frame difference equation is $l_{ij}(t_2)-l(i+\Delta x_{ij}(t_2), j+\Delta y_{ij}(t_2), t_1)=0$; and
wherein the plurality of displacement vector invariant equations consists of:
a first backward displacement vector invariant equation, being $\Delta x(x,y,t_1)+\Delta x(x+\Delta x(x,y,t_1),y+\Delta y(x,y,t_1),t_2)=0$, and
a second backward displacement vector invariant equation, being $\Delta y(x,y,t_1)+\Delta y(x+\Delta x(x,y,t_1),y+\Delta y(x,y,t_1), t_2)=0$;
where l is an intensity of the image data; i is a pixel index in a horizontal direction x; j is a pixel index in a vertical direction y orthogonal to the horizontal direction x; $t_1$ is one of the different times; $t_2$ is another of the different times; $\Delta x_{ij}(t_1)$ is a displacement vector at pixel location ij at the one time in the horizontal direction; $\Delta x_{ij}(t_2)$ is a displacement vector at pixel location ij at the other time in the horizontal direction; $\Delta y_{ij}(t_1)$ is a displacement vector at pixel location ij at the one time in the vertical direction; and $\Delta y_{ij}(t_2)$ is a displacement vector at pixel location ij at the other time in the vertical direction.

5. The method of claim 4:
wherein solving the equation set comprises solving the backward displacement vector invariant equations in the equation set using a lookup table of records at a time t that are off indexed pixel locations, with each record including position coordinates $x=i+\Delta x_{ij}(t_1)$ and $y=j+\Delta y_{ij}(t_1)$, and matrix values of $\Delta x_{ij}(t_1)$ and $\Delta y_{ij}(t_1)$ for all $i\in[0,N_x-1]\cap j\in[0,N_y-1]$; and
wherein solving the equation set comprises, for all pixel locations, evaluating all the values of the matrix field $\Delta x_{ij}(t_2)$ and $\Delta y_{ij}(t_2)$ on a given pixel location by a bilinear interpolation method and a searching algorithm that finds three or four available values of the field $\Delta x(x, y, t_2)$ and $\Delta y(x, y, t_2)$ in the lookup table for all nearest points around the given pixel location.

6. The method of claim 4, wherein solving the equation set comprises solving the backward displacement vector invariant equations in the equation set by a damped Newton-Raphson method using iteration equations for solving the matrix field at time $t_1$ to solve for $X_1$ and $Y_1$ at time t for all pixel locations i and j, the iteration equations being given by:

$$\begin{pmatrix} x_1^{(m+1)} \\ y_1^{(m+1)} \end{pmatrix} = \begin{pmatrix} x_1^{(m)} \\ y_1^{(m)} \end{pmatrix} - \begin{pmatrix} \frac{\partial e_1^{(m)}}{\partial x_1^{(m)}} & \frac{\partial e_1^{(m)}}{\partial y_1^{(m)}} \\ \frac{\partial e_2^{(m)}}{\partial x_1^{(m)}} & \frac{\partial e_2^{(m)}}{\partial y_1^{(m)}} \end{pmatrix}^{-1} \begin{pmatrix} e_1^{(m)} \\ e_2^{(m)} \end{pmatrix}$$

where m is an iteration index, and where variables $e_1$ and $e_2$ are defined as follows:

$$\begin{cases} e_1 = x_1 + \Delta x(x_1, y_1, t_1) - i = 0 \\ e_2 = y_1 + \Delta y(x_1, y_1, t_1) - j = 0; \end{cases}$$

and
wherein solving the equation set comprises solving the backward displacement vector invariant equations for all pixel locations using the following:

$$\begin{cases} \Delta x_{ij}(t_2) = -\Delta x(x_1, y_1, t_1) \\ \Delta y_{ij}(t_2) = -\Delta y(x_1, y_1, t_1). \end{cases}$$

7. The method of claim 1, wherein solving the equation set comprises using at least one iteration equation derived from the equation set by conversion to a fully or over-constrained system using a nonlinear least squares model of the displacement field.

8. The method of claim 1, wherein solving the equation set comprises using at least one bilinear polynomial function expressing a multidimensional displacement field.

9. A motion estimator apparatus, comprising:
at least one processor; and
a memory storing a fully constrained nonlinear equation set including:
 a forward displaced frame difference equation,
 a backward displaced frame difference equation, and
 a plurality of displacement vector invariant equations;
the at least one processor operative to receive an input image sequence comprising a pair of image frames individually including multidimensional image data corresponding to a plurality of pixel locations at different times; and
the at least one processor operative to solve the equation set using an iteration equation and the image data of the pair of image frames to determine a displacement field describing displacement vectors at pixel locations at one time by solving displacement field values at another time from the plurality of displacement vector invariant equations,
wherein the multidimensional image data of the pair of frames is two-dimensional;
wherein the forward displaced frame difference equation is $l(i+\Delta x_{ij}(t_1), j+\Delta y_{ij}(t_1), t_2)-l_{ij}(t_1)=0$;
wherein the backward displaced frame difference equation is $l_{ij}(t_2)-l(i+\Delta x_{ij}(t_2), j+\Delta y_{ij}(t_2), t_1)=0$; and
wherein the plurality of displacement vector invariant equations consists of:
 a first forward displacement vector invariant equation, being $\Delta x_{ij}(t_2)+\Delta x(i+\Delta x_{ij}(t_2), j+\Delta y_{ij}(t_2), t_1)=0$, and
 a second forward displacement vector invariant equation, being $\Delta y_{ij}(t_2)+\Delta y(i+\Delta x_{ij}(t_2), j+\Delta y_{ij}(t_2), t_1)=0$;
where l is an intensity of the image data; i is a pixel index in a horizontal direction x; j is a pixel index in a vertical direction y orthogonal to the horizontal direction x; $t_1$ is the one time; $t_2$ is the other time; $\Delta x_{ij}(t_1)$ is a displacement vector at pixel location i and j at the one time in the horizontal direction; $\Delta x_{ij}(t_2)$ is a displacement vector at pixel location i and j at the other time in the horizontal direction; $\Delta y_{ij}(t_1)$ is a displacement vector at pixel location i and j at the one time in the vertical direction; and $\Delta y_{ij}(t_2)$ is a displacement vector at pixel location i and j at the other time in the vertical direction.

10. The motion estimator apparatus of claim 9:
wherein the at least one processor is operative to solve the forward displacement vector invariant equations in the equation set using a lookup table of records at a time t that are off indexed pixel locations, with each record including position coordinates $x=i+\Delta x_{ij}(t_1)$ and $y=j+\Delta y_{ij}(t_1)$, and matrix values of $\Delta x_{ij}(t_1)$ and $\Delta y_{ij}(t_1)$ for all $i \in [0, N_x-1] \cap j \in [0, N_y-1]$; and
wherein the at least one processor is operative, for all pixel locations, to evaluate all the values of the matrix field $\Delta x_{ij}(t_2)$ and $\Delta y_{ij}(t_2)$ on a given pixel location by a bilinear interpolation method and a searching algorithm that finds three or four available values of the field $\Delta x(x, y, t_2)$ and $\Delta y(x, y, t_2)$ in the lookup table for all nearest points around the given pixel location.

11. The motion estimator apparatus of claim 9, wherein the at least one processor is operative to solve the forward displacement vector invariant equations in the equation set by a damped Newton-Raphson method using iteration equations for solving the matrix field at time $t_2$ for all pixel locations i and j, the iteration equations being given by:

$$\begin{pmatrix} \Delta x_{ij}^{(m+1)}(t_2) \\ \Delta y_{ij}^{(m+1)}(t_2) \end{pmatrix} = \begin{pmatrix} \Delta x_{ij}^{(m)}(t_2) \\ \Delta y_{ij}^{(m)}(t_2) \end{pmatrix} - \begin{pmatrix} \frac{\partial \varepsilon_1^{(m)}}{\partial \Delta x_{ij}^{(m)}(t_2)} & \frac{\partial \varepsilon_1^{(m)}}{\partial \Delta y_{ij}^{(m)}(t_2)} \\ \frac{\partial \varepsilon_2^{(m)}}{\partial \Delta x_{ij}^{(m)}(t_2)} & \frac{\partial \varepsilon_2^{(m)}}{\partial \Delta y_{ij}^{(m)}(t_2)} \end{pmatrix}^{-1} \begin{pmatrix} \varepsilon_1^{(m)} \\ \varepsilon_2^{(m)} \end{pmatrix}$$

where m is an iteration index; and
wherein the at least one processor is operative to evaluate derivatives with respect variables $\Delta x_{ij}(t_2)$ and $\Delta y_{ij}(t_2)$ in the iteration equations by the following bilinear function:

$$\{\Delta x(x, y, t_1), \Delta y(x, y, t_1)\} =$$

$$\{\Delta x_{pq}(t_1), \Delta y_{pq}(t_1)\}\frac{(n_x - x + p)(n_y - y + q)}{n_x n_y} + +\{\Delta x_{p+n_x,q}(t_1), \Delta y_{p+n_x,q}(t_1)\}$$

$$\frac{(x - p)(n_y - y + q)}{n_x n_y} + +\{\Delta x_{p,q+n_y}(t_1), \Delta y_{p,q+n_y}(t_1)\}$$

$$\frac{(n_x - x + p)(y - q)}{n_x n_y} + +\{\Delta x_{p+n_x,q+n_y}(t_1), \Delta y_{p+n_x,q+n_y}(t_1)\}\frac{(x - p)(y - q)}{n_x n_y}$$

and $$\{p, q\} = \left\{n_x \left\lfloor \frac{x}{n_x} \right\rfloor, n_y \left\lfloor \frac{y}{n_y} \right\rfloor\right\},$$

where $\lfloor\ \rfloor$ denotes an integer operator, and $n_x$ and $n_y$ are a number of interpolation points on x and y directions.

12. A motion estimator apparatus, comprising:
   at least one processor; and
   a memory storing a fully constrained nonlinear equation set including:
      a forward displaced frame difference equation,
      a backward displaced frame difference equation, and
      a plurality of displacement vector invariant equations;
   the at least one processor operative to receive an input image sequence comprising a pair of image frames individually including multidimensional image data corresponding to a plurality of pixel locations at different times; and
   the at least one processor operative to solve the equation set using an iteration equation and the image data of the pair of image frames to determine a displacement field describing displacement vectors at pixel locations at one time by solving displacement field values at another time from the plurality of displacement vector invariant equations,
   wherein the multidimensional image data of the pair of frames is two-dimensional;
   wherein the forward displaced frame difference equation is $l(i+\Delta x_{ij}(t_1), j+\Delta y_{ij}(t_1), t_2)-l_{ij}(t_1)=0$;
   wherein the backward displaced frame difference equation is $l_{ij}(t_2)-l(i+\Delta x_{ij}(t_2), j+\Delta y_{ij}(t_2), t_1)=0$; and
   wherein the plurality of displacement vector invariant equations consists of:
      a first backward displacement vector invariant equation, being $\Delta x(x,y,t_1)+\Delta x(x+\Delta x(x,y,t_1),y+\Delta y(x,y,t_1),t_2)=0$, and
      a second backward displacement vector invariant equation, being $\Delta y(x,y,t_1)+\Delta y(x+\Delta x(x,y,t_1),y+\Delta y(x,y,t_1), t_2)=0$;
where l is an intensity of the image data; i is a pixel index in a horizontal direction x; j is a pixel index in a vertical direction y orthogonal to the horizontal direction x; $t_1$ is one of the different times; $t_2$ is another of the different times; $\Delta x_{ij}(t_1)$ is a displacement vector at pixel location ij at the one time in the horizontal direction; $\Delta x_{ij}(t_2)$ is a displacement vector at pixel location ij at the other time in the horizontal direction; $\Delta y_{ij}(t_1)$ is a displacement vector at pixel location ij at the one time in the vertical direction; and $\Delta y_{ij}(t_2)$ is a displacement vector at pixel location ij at the other time in the vertical direction.

13. The motion estimator apparatus of claim 12:
   wherein the at least one processor is operative to solve the backward displacement vector invariant equations in the equation set using a lookup table of records at a time t that are off indexed pixel locations, with each record including position coordinates $x=i+\Delta x_{ij}(t_1)$ and $y=j+\Delta y_{ij}(t_1)$, and matrix values of $\Delta x_{ij}(t_1)$ and $\Delta y_{ij}(t_1)$ for all $i\in[0,N_x-1]\cap j\in[0,N_y-1]$; and
   wherein the at least one processor is operative, for all pixel locations, evaluating all the values of the matrix field $\Delta x_{ij}(t_2)$ and $\Delta y_{ij}(t_2)$ on a given pixel location by a bilinear interpolation method and a searching algorithm that finds three or four available values of the field $\Delta x(x, y, t_2)$ and $\Delta y(x, y, t_2)$ in the lookup table for all nearest points around the given pixel location.

14. The motion estimator apparatus of claim 12, wherein the at least one processor is operative to solve the backward displacement vector invariant equations in the equation set by a damped Newton-Raphson method using iteration equations for solving the matrix field at time $t_1$ to solve for $X_1$ and $Y_1$ at time t for all pixel locations i and j, the iteration equations being given by:

$$\begin{pmatrix} x_1^{(m+1)} \\ y_1^{(m+1)} \end{pmatrix} = \begin{pmatrix} x_1^{(m)} \\ y_1^{(m)} \end{pmatrix} - \begin{pmatrix} \frac{\partial e_1^{(m)}}{\partial x_1^{(m)}} & \frac{\partial e_1^{(m)}}{\partial y_1^{(m)}} \\ \frac{\partial e_2^{(m)}}{\partial x_1^{(m)}} & \frac{\partial e_2^{(m)}}{\partial y_1^{(m)}} \end{pmatrix}^{-1} \begin{pmatrix} e_1^{(m)} \\ e_2^{(m)} \end{pmatrix}$$

where m is an iteration index, and where variables $e_1$ and $e_2$ are defined as follows:

$$\begin{cases} e_1 = x_1 + \Delta x(x_1, y_1, t_1) - i = 0 \\ e_2 = y_1 + \Delta y(x_1, y_1, t_1) - j = 0; \end{cases}$$

and
   wherein the at least one processor is operative to solve the backward displacement vector invariant equations for all pixel locations using the following:

$$\begin{cases} \Delta x_{ij}(t_2) = -\Delta x(x_1, y_1, t_1) \\ \Delta y_{ij}(t_2) = -\Delta y(x_1, y_1, t_1). \end{cases}$$

15. The motion estimator apparatus of claim 9, wherein the at least one processor is operative to solve the equation set using at least one iteration equation derived from the equation set by conversion to a fully or over-constrained system using a nonlinear least squares model of the displacement field.

16. The motion estimator apparatus of claim 9, wherein the at least one processor is operative to solve the equation set using at least one bilinear polynomial function expressing a multidimensional displacement field.

17. A non-transitory computer readable medium with computer executable instructions for:
   providing a fully constrained nonlinear equation set including:
      a forward displaced frame difference equation,
      a backward displaced frame difference equation, and
      a plurality of displaced vector invariant equations;
   receiving an input image sequence comprising a pair of image frames individually including multidimensional image data corresponding to a plurality of pixel locations at different times; and
   solving the equation set using an iteration equation and the image data of the pair of image frames to determine a displacement field describing displacement vectors at pixel locations at one time solving displacement field values at another time from the plurality of displacement vector invariant equations,
   wherein the multidimensional image data of the pair of frames is two-dimensional;
   wherein the forward displaced frame difference equation is $l(i+\Delta x_{ij}(t_1), j+\Delta y_{ij}(t_1), t_2)-l_{ij}(t_1)=0$;
   wherein the backward displaced frame difference equation is $l_{ij}(t_2)-l(i+\Delta x_{ij}(t_2), j+\Delta y_{ij}(t_2), t_1)=0$; and
   wherein the plurality of displacement vector invariant equations consists of:
      a first forward displacement vector invariant equation, being $\Delta x_{ij}(t_2)+\Delta x(i+\Delta x_{ij}(t_2), j+\Delta y_{ij}(t_2), t_1)=0$, and
      a second forward displacement vector invariant equation, being $\Delta y_{ij}(t_2)+\Delta y(i+\Delta x_{ij}(t_2), j+\Delta y_{ij}(t_2), t_1)=0$;
   where l is an intensity of the image data; i is a pixel index in a horizontal direction x; j is a pixel index in a vertical direction y orthogonal to the horizontal direction x; $t_1$ is the one time; $t_2$ is the other time; $\Delta x_{ij}(t_1)$ is a displacement vector at pixel location i and j at the one time in the horizontal direction; $\Delta x_{ij}(t_2)$ is a displacement vector at pixel location i and j at the other time in the horizontal direction; $\Delta y_{ij}(t_1)$ is a displacement vector at pixel location i and j at the one time in the vertical direction; and $\Delta y_{ij}(t_2)$ is a displacement vector at pixel location i and j at the other time in the vertical direction.

18. The non-transitory computer readable medium of claim 17, comprising computer executable instructions for solving the forward displacement vector invariant equations in the equation set by a damped Newton-Raphson method using iteration equations for solving the matrix field at time $t_2$ for all pixel locations i and j, the iteration equations being given by:

$$\begin{pmatrix} \Delta x_{ij}^{(m+1)}(t_2) \\ \Delta y_{ij}^{(m+1)}(t_2) \end{pmatrix} = \begin{pmatrix} \Delta x_{ij}^{(m)}(t_2) \\ \Delta y_{ij}^{(m)}(t_2) \end{pmatrix} - \begin{pmatrix} \frac{\partial \varepsilon_1^{(m)}}{\partial \Delta x_{ij}^{(m)}(t_2)} & \frac{\partial \varepsilon_1^{(m)}}{\partial \Delta y_{ij}^{(m)}(t_2)} \\ \frac{\partial \varepsilon_2^{(m)}}{\partial \Delta x_{ij}^{(m)}(t_2)} & \frac{\partial \varepsilon_2^{(m)}}{\partial \Delta y_{ij}^{(m)}(t_2)} \end{pmatrix}^{-1} \begin{pmatrix} \varepsilon_1^{(m)} \\ \varepsilon_2^{(m)} \end{pmatrix}$$

where m is an iteration index; and
computer-executable instructions for solving evaluating derivatives with respect variables $\Delta x_{ij}(t_2)$ and $\Delta y_{ij}(t_2)$ in the iteration equations by the following bilinear function:

$$\{\Delta x(x, y, t_1), \Delta y(x, y, t_1)\} =$$
$$\{\Delta x_{pq}(t_1), \Delta y_{pq}(t_1)\} \frac{(n_x - x + p)(n_y - y + q)}{n_x n_y} + + \{\Delta x_{p+n_x,q}(t_1), \Delta y_{p+n_x,q}(t_1)\}$$
$$\frac{(x - p)(n_y - y + q)}{n_x n_y} + + \{\Delta x_{p,q+n_y}(t_1), \Delta y_{p,q+n_y}(t_1)\}$$
$$\frac{(n_x - x + p)(y - q)}{n_x n_y} + + \{\Delta x_{p+n_x,q+n_y}(t_1), \Delta y_{p+n_x,q+n_y}(t_1)\} \frac{(x - p)(y - q)}{n_x n_y}$$

and $$\{p, q\} = \left\{ n_x \left\lfloor \frac{x}{n_x} \right\rfloor, n_y \left\lfloor \frac{y}{n_y} \right\rfloor \right\},$$

where $\lfloor \ \rfloor$ denotes an integer operator, and $n_x$ and $n_y$ are a number of interpolation points on x and y directions.

19. A non-transitory computer readable medium with computer executable instructions for:
providing a fully constrained nonlinear equation set including:
a forward displaced frame difference equation,
a backward displaced frame difference equation, and
a plurality of displaced vector invariant equations;
receiving an input image sequence comprising a pair of image frames individually including multidimensional image data corresponding to a plurality of pixel locations at different times; and
solving the equation set using an iteration equation and the image data of the pair of image frames to determine a displacement field describing displacement vectors at pixel locations at one time solving displacement field values at another time from the plurality of displacement vector invariant equations,
wherein the multidimensional image data of the pair of frames is two-dimensional;
wherein the forward displaced frame difference equation is $l(i+\Delta x_{ij}(t_1), j+\Delta y_{ij}(t_1), t_2)-l_{ij}(t_1)=0$;
wherein the backward displaced frame difference equation is $l_{ij}(t_2)-l(i+\Delta x_{ij}(t_2), j+\Delta y_{ij}(t_2), t_1)=0$; and
wherein the plurality of displacement vector invariant equations consists of:
a first backward displacement vector invariant equation, being $\Delta x(x,y,t_1)+\Delta x(x+\Delta x(x,y,t_1),y+\Delta y(x,y,t_1),t_2)=0$, and
a second backward displacement vector invariant equation, being $\Delta y(x,y,t_1)+\Delta y(x+\Delta x(x,y,t_1),y+\Delta y(x,y,t_1),t_2)=0$;
where l is an intensity of the image data; i is a pixel index in a horizontal direction x; j is a pixel index in a vertical direction y orthogonal to the horizontal direction x; $t_1$ is one of the different times; $t_2$ is another of the different times; $\Delta x_{ij}(t_1)$ is a displacement vector at pixel location i and j at the one time in the horizontal direction; $\Delta x_{ij}(t_2)$ is a displacement vector at pixel location i and j at the other time in the horizontal direction; $\Delta y_{ij}(t_1)$ is a displacement vector at pixel location i and j at the one time in the vertical direction; and $\Delta y_{ij}(t_2)$ is a displacement vector at pixel location i and j at the other time in the vertical direction.

20. The non-transitory computer readable medium of claim 19, comprising computer-executable instructions for solving the backward displacement vector invariant equations in the equation set by a damped Newton-Raphson method using iteration equations for solving the matrix field at time $t_1$ to solve for $X_1$ and $Y_1$ at time t for all pixel locations i and j, the iteration equations being given by:

$$\begin{pmatrix} x_1^{(m+1)} \\ y_1^{(m+1)} \end{pmatrix} = \begin{pmatrix} x_1^{(m)} \\ y_1^{(m)} \end{pmatrix} - \begin{pmatrix} \frac{\partial e_1^{(m)}}{\partial x_1^{(m)}} & \frac{\partial e_1^{(m)}}{\partial y_1^{(m)}} \\ \frac{\partial e_2^{(m)}}{\partial x_1^{(m)}} & \frac{\partial e_2^{(m)}}{\partial y_1^{(m)}} \end{pmatrix}^{-1} \begin{pmatrix} e_1^{(m)} \\ e_2^{(m)} \end{pmatrix}$$

where m is an iteration index, and where variables $e_1$ and $e_2$ are defined as follows:

$$\begin{cases} e_1 = x_1 + \Delta x(x_1, y_1, t_1) - i = 0 \\ e_2 = y_1 + \Delta y(x_1, y_1, t_1) - j = 0; \end{cases}$$

and
comprising computer executable instructions for solving the backward displacement vector invariant equations for all pixel locations using the following:

$$\begin{cases} \Delta x_{ij}(t_2) = -\Delta x(x_1, y_1, t_1) \\ \Delta y_{ij}(t_2) = -\Delta y(x_1, y_1, t_1). \end{cases}$$

21. The non-transitory computer readable medium of claim 17, comprising computer-executable instructions for solving the equation set using at least one iteration equation derived from the equation set by conversion to a fully or over-constrained system using a nonlinear least squares model of the displacement field.

22. The non-transitory computer readable medium of claim 17, comprising computer-executable instructions for solving the equation set using at least one bilinear polynomial function expressing a multidimensional displacement field.

* * * * *